United States Patent
Lu et al.

(10) Patent No.: US 10,228,875 B2
(45) Date of Patent: Mar. 12, 2019

(54) DATA WRITING AND READING METHODS FOR FLASH

(71) Applicant: Feitian Technologies Co., Ltd., Beijing (CN)

(72) Inventors: Zhou Lu, Beijing (CN); Huazhang Yu, Beijing (CN)

(73) Assignee: FEITIAN TECHNOLOGIES CO., LTD., Beijing (CN)

( * ) Notice: Subject to any disclaimer, the term of this patent is extended or adjusted under 35 U.S.C. 154(b) by 129 days.

(21) Appl. No.: 15/107,326

(22) PCT Filed: Dec. 23, 2014

(86) PCT No.: PCT/CN2014/094668
§ 371 (c)(1),
(2) Date: Jun. 22, 2016

(87) PCT Pub. No.: WO2015/096698
PCT Pub. Date: Jul. 2, 2015

(65) Prior Publication Data
US 2017/0010833 A1   Jan. 12, 2017

(30) Foreign Application Priority Data

Dec. 24, 2013   (CN) .......................... 2013 1 0718814
Dec. 24, 2013   (CN) .......................... 2013 1 0721756
Jan. 20, 2014   (CN) .......................... 2014 1 0024168

(51) Int. Cl.
G06F 3/06   (2006.01)
G06F 12/02  (2006.01)

(52) U.S. Cl.
CPC .......... *G06F 3/0629* (2013.01); *G06F 3/0604* (2013.01); *G06F 3/0679* (2013.01); *G06F 12/0246* (2013.01)

(58) Field of Classification Search
CPC .... G06F 3/0629; G06F 3/0604; G06F 3/0679; G06F 12/0246
See application file for complete search history.

(56) References Cited

U.S. PATENT DOCUMENTS

2002/0184436 A1* 12/2002 Kim .................... G06F 12/0246
                                                          711/103
2005/0144368 A1*  6/2005 Chung ................ G06F 12/0246
                                                          711/103
(Continued)

FOREIGN PATENT DOCUMENTS

CN           1389790 A       1/2003
CN         103645990 A       3/2014
(Continued)

OTHER PUBLICATIONS

International Search Report dated Apr. 10, 2015 for PCT application No. PCT/CN2014/094668.

*Primary Examiner* — Reginald G Bragdon
*Assistant Examiner* — Mehdi Namazi
(74) *Attorney, Agent, or Firm* — Ohlandt, Greeley, Ruggiero & Perle, LLP

(57) ABSTRACT

Data writing and reading methods for a flash. The data writing method comprises: when remaining spaces of a data area and of an index area of a physical page are sufficient, sequentially storing present-instance write data into the data area of the physical page, and generating an index journal and sequentially writing same into the index area of the physical page; otherwise, organizing actual data in the physical page, storing the actual data into a data area of an idle page, and generating, on the basis of the actual data, an index journal and writing same into an index area of the idle page. The data reading method comprises: acquiring the actual memory address of to-be-read data on the basis of the (Continued)

index journal in the index area of the physical page, and reading the data from the actual memory address.

29 Claims, 19 Drawing Sheets

(56) References Cited

U.S. PATENT DOCUMENTS

| | | | |
|---|---|---|---|
| 2007/0245070 A1 | 10/2007 | Mitsunaga | |
| 2013/0311707 A1* | 11/2013 | Kawamura | G06F 12/0246 |
| | | | 711/103 |
| 2014/0095827 A1* | 4/2014 | Wei | G06F 12/0246 |
| | | | 711/203 |
| 2014/0173233 A1* | 6/2014 | Higashiyama | G06F 11/1441 |
| | | | 711/162 |
| 2015/0058527 A1* | 2/2015 | Venkata | G06F 12/0873 |
| | | | 711/103 |

FOREIGN PATENT DOCUMENTS

| | | |
|---|---|---|
| CN | 103645993 A | 3/2014 |
| CN | 103729303 A | 4/2014 |

\* cited by examiner

Physical   Offset-address-
address    in-page

0x5000     0x0000
```
11 11 11 11 11 22 22 22 22 33 33 33 33 33 44 44 44 44 44 55 55 55
55 55 FF FF FF FF FF FF FF FF FF FF FF FF FF FF FF FF FF FF FF FF
FF ...
```
} Data area 0x5C00     0x0C00
```
00 00 00 05 00 00 00 05 00 05 00 05 00 00 00 05 00 0A 00 05 00 05 00
0F 00 00 00 05 00 14 FF FF FF FF FF FF FF FF FF FF FF FF FF FF FF
FF...                                                    FF FF
```
} Index area 0x6000     0x1000

Fig. 2

Physical   Offset-address-
address    in-page

0x5000     0x0000
```
11 11 11 11 11 22 22 22 22 33 33 33 33 33 44 44 44 44 44 55 55 55
55 55 66 66 66 66 66 FF FF FF FF FF FF FF FF FF FF FF FF FF FF FF
FF ...
```
} Data area 0x5C00     0x0C00
```
00 00 00 05 00 00 00 05 00 05 00 05 00 00 00 05 00 0A 00 05 00 05 00
0F 00 00 00 05 00 14 FF FF FF FF FF FF FF FF FF FF FF FF FF FF FF
FF...                                                    FF FF
```
} Index area 0x6000     0x1000

Fig. 3

| Physical address | Offset-address-in-page | | |
|---|---|---|---|
| 0x5000 | 0x0000 | 11 11 11 11 11 22 22 22 22 22 33 33 33 33 33 44 44 44 44 44 55 55 55<br>55 55 66 66 66 66 66 FF FF FF FF FF FF FF FF FF FF FF FF FF FF FF FF<br>FF ... ... ... ... ... ... ... ... ... ... ... ... ... ... ... ...<br>... ... ... ... ... ... ... ... ... ... ... ... ... ... ... ... ...<br>... ... ... ... ... ... ... ... ... ... ... ... ... ... ... ... ...<br>... ... ... ... ... ... ... ... ... ... ... ... ... ... ... ... ...<br>... ... ... ... ... ... ... ... ... ... ... ... ... ... ... ... ...<br>... ... ... ... ... ... ... ... ... ... ... ... ... ... ... ... ...<br>... ... ... ... ... ... ... ... ... ... ... ... ... ... ... ... ...<br>... ... ... ... ... ... ... ... ... ... ... ... ... ... ... ... ...<br>... ... ... ... ... ... ... ... ... ... ... ... ... ... ... FF FF | } Data area |
| 0x5C00 | 0x0C00 | 00 00 00 05 00 00 00 05 00 05 00 05 00 00 00 05 00 0A 00 05 00 05 00<br>0F 00 00 00 05 00 14 00 05 00 05 00 19 FF FF FF FF FF FF FF FF FF FF<br>FF... ... ... ... ... ... ... ... ... ... ... ... ... ... ... ... | } Index area |
| 0x6000 | 0x1000 | ... ... ... ... ... ... ... ... ... ... ... ... ... ... FF FF | |

Fig. 4

| Physical address | Offset-address-in-page | | |
|---|---|---|---|
| 0x5000 | 0x0000 | 11 11 11 11 11 22 22 22 22 22<br>33 33 33 33 33 44 44 44 44 44<br>55 55 55 55 55 FF FF FF FF FF | } Data area |
| 0x501E | 0x001E | 00 00 00 05 00 00 00 05 00 05<br>00 05 00 00 00 05 00 0A 00 05<br>00 05 00 0F 00 00 00 05 00 14 | } Index area |
| 0x503C | 0x003C | | |

| Physical address | Offset-address-in-page | | |
|---|---|---|---|
| 0x4000 | 0x0000 | 80 00 00 00 44 44 44 44 44 44 44 44 44 44 44 44··· (total 2048 bytes of 44) | |
| 0x4804 | 0x0804 | 04 00 80 00 55 55 55 55 55 55 55 55 55 55 55 55··· (total 1024 bytes of 55) | Log area |
| 0x4C08 | 0x0C08 | 03 EE 0C 00 66 66 66 66 66 66···66 (total 1006 bytes of 66) FF FF FF ··· (All data after last byte of 66 of the Flash page is FF) | |
| 0x5400 | 0x1400 | | |

DATA WRITING AND READING METHODS FOR FLASH

This application claims priority to Chinese patent application, entitled "METHOD FOR WRITING AND READING DATA OF FLASH" with Application Number of 201410024168.6 and filed with the Chinese Patent Office on Jan. 20, 2014, Chinese patent application, entitled "METHOD FOR UPDATING AND READING DATA BASED ON BIG PAGE FLASH" with Application Number of 201310721756.0 and filed with the Chinese Patent Office on Dec. 24, 2013 and Chinese patent application, entitled "METHOD FOR UPDATING AND READING DATA BASED ON BIG PAGE FLASH" with Application Number of 201310718814.4 and filed with the Chinese Patent Office on Dec. 24, 2013, which are hereby incorporated by reference in their entirety.

FIELD OF THE INVENTION

The present invention relates to storage field, more particularly, to a method for writing and reading Flash data.

BACKGROUND OF THE INVENTION

Flash, as a kind of storage chip, combines advantages of ROM (Read Only Memory) and RAM (Random Access Memory), which is not only erasable and programmable but also can be read quickly and data will not be lost due to power down.

In the process of realizing the present invention, the inventors found that, based on characteristic that data of Flash can only be erased by taking a block or the whole piece as a unit, the prior art has following defections: the page size of some Flash chip is very big, however contents required to be updated each time are less in application. According to a general method at present, even there are only several bytes which are required to be updated each time, a free or empty physical page is required to be searched again and then content of an original page is updated in the RAM and the updated page is written on a new physical page. The method applied for data updating has low efficiency and shortens the life of the Flash.

SUMMARY OF THE INVENTION

The purpose of the present invention is for overcoming defection of the prior art and the present invention provides a method for writing and reading Flash data.

A method for writing and reading Flash data, the method includes:
where writing the Flash data includes:
S1 of obtaining a logical page number of data to be written this time and an offset-address-in-page of the data to be written this time according to a writing address; searching for a physical page corresponding to the logical page number of the data to be written this time based on a corresponding relation between a logical page number and a physical page number;
S2 of determining whether a remaining space of the physical page is sufficient, completing writing data by writing a generated log in the remaining space and ending the writing the Flash data if the remaining space of the physical page is sufficient; otherwise, executing step S3;
S3 of searching for a free page, executing step S4;
S4 of organizing page information of the physical page and information of the data to be written to obtain updated information, completing writing the Flash data in the free page found based on the updated information, executing step S5;
S5 of updating the corresponding relation between the logical page number and the physical page number;
where reading Flash data includes:
S10 of when data in a physical page is required to be read, computing a logical page number of data to be read this time and an offset-address-in-page of the data to be read this time based on a reading address, searching for a physical page corresponding to the logical page number of data to be read this time based on the corresponding relation between the logical page number and the physical page number;
S20 of reading a log in the physical page, reading corresponding data from the physical page based on a storing address of written data and a length of the written data in the read log, updating corresponding data with the read data based on an offset-address-in-page of the written data in the read log;
S30 of reading the data to be read this time from the updated data based on the offset-address-in-page of the data to be read this time and a length of the data to be read this time, ending the reading Flash data.

Determining whether a remaining space of the physical page is sufficient, completing writing data by writing a generated log in the remaining space if the remaining space of the physical page is sufficient includes:
determining whether both remaining spaces of a data area and an index area are sufficient, storing the data to be written this time in the data area of the physical page orderly if both the remaining spaces of the data area and the index area are sufficient, and generating a piece of index log based on the offset-address-in-page of the data to be written this time, a length of the data to be written this time and a storing address of the data to be written this time, writing the generated piece of index log to the index area of the physical page orderly;
where the page information of the physical page includes a piece of index log in the index area of the physical page, the information of the data to be written includes the data to be written this time, where organizing page information of the physical page and information of the data to be written to obtain updated information, completing writing data in the free page found based on the updated information includes:
reading data stored in the data area of the physical page, organizing the read data based on the piece of index log in the index area of the physical page and the data to be written this time to obtain valid data in the data area of the physical page, writing the valid data in a data area of the free page, generating a piece of index log based on the valid data and writing the generated piece of index log in an index area of the free page;
when the data in the physical page is required to be read, the method further includes initializing a memory space of which a size is the same as a size of the data area of the physical page;
where reading a log in the physical page, reading corresponding data from the physical page based on a storing address of written data and a length of the written data in the read log, updating the corresponding data with the read data based on the offset-address-in-page of the written data in the read log includes:
U30 of orderly reading a piece of index log in the index area of the physical page, reading the corresponding data from the data area of the physical page based on the storing address of written data and the length of the written data in the read log, writing the read data into a corresponding position of the memory space based on the offset-address-in-page of the written data in the read piece of index log.

Determining whether a remaining space of the physical page is sufficient, completing writing data by writing a generated log in the remaining space if the remaining space of the physical page is sufficient includes:

determining whether the remaining spaces of both the data area and the index area of the physical page are sufficient, storing the data to be written this time in the data area of the physical page orderly if both the remaining spaces of the data area and the index area are sufficient, generating a piece of index log based on the offset-address-in-page of the data to be written this time, the length of the data to be written this time and the storing address of the data to be written this time, writing the generated piece of index log to the index area of the physical page orderly;

where the page information of the physical page includes the piece of index log in the index area of the physical page, the information of the data to be written includes the data to be written this time, where organizing page information of the physical page and information of the data to be written to obtain updated information, completing writing data in the free page found based on the updated information includes:

reading data stored in the data area of the physical page, organizing the read data based on the piece of index log in the index area of the physical page and the data to be written this time to obtain valid data in the data area of the physical page, orderly writing the valid data in a data area of the free page, generating a piece of index log based on the valid data and writing the generated piece of index log in an index area of the free page;

where when the data in a physical page is required to be read, reading a log in the physical page, reading corresponding data from the physical page based on a storing address of written data and a length of the written data in the read log, updating corresponding data with the read data based on an offset-address-in-page of the written data in the read log and reading the data to be read this time from the updated data based on the offset-address-in-page of the data to be read this time and a length of the data to be read this time includes:

T20 of setting and resetting a read flag corresponding to the data to be read this time based on the length of the data to be read this time;

T30 of searching for and reading a last piece of index log in the index area of the physical page and taking the last piece of index log as a current piece of index log;

T40 of determining whether the current piece of index log relates to the data, of which the read flag is not set, in the data to be read this time based on the offset-address-in-page of the written data and the length of the written data in the current index flag, executing step T60 if the current piece of index log relates to the data, of which the read flag is not set, in the data to be read this time; otherwise, executing step T50;

T50 of reading a previous piece of index log of the current piece of index log and taking the previous piece of the index log as a current piece of index log, executing step T40;

T60 of reading related data from the physical page based on the storing address of the written data in the current piece of index log and setting a read flag corresponding to the read data;

T70 of checking the read flag corresponding to the data to be read this time, determining whether all of the data to be read this time is read, ending the reading of Flash data if all of the data to be read this time is read; otherwise, executing step T50.

Determining whether a remaining space of the physical page is sufficient, completing writing data by writing a generated piece of index log in the remaining space if the remaining space of the physical page is sufficient includes:

determining whether the remaining spaces of both a data area and a index area of the physical page are sufficient, orderly storing the data to be written this time in the data area of the physical page if both the remaining spaces of the data area and the index area are sufficient, generating a piece of index log based on an offset-address-in-page of the data to be written this time, a length of the data to be written this time and a storing address of the data to be written this time, writing the generated piece of index log in the index area of the physical page orderly;

where the page information of the physical page includes the piece of index log in the index area of the physical page, the information of the data to be written includes the data to be written this time, where organizing page information of the physical page and information of the data to be written to obtain updated information, completing writing data in the free page found based on the updated information includes:

reading data stored in the data area of the physical page, organizing the read data based on the piece of index log in the index area of the physical page and the data to be written this time to obtain valid data in the data area of the physical page, writing the valid data orderly in a data area of the free page, generating a piece of index log based on the valid data, writing the generated piece of index log orderly in a the index area of the free page, updating the corresponding relation between the logical page number and the physical page number;

where when data in the physical page is required to be read, reading a log in the physical page, reading corresponding data from the physical page based on a storing address of written data and a length of the written data in the read log, updating corresponding data with the read data based on an offset-address-in-page of the written data in the read log and reading the data to be read this time from the updated data based on the offset-address-in-page of the data to be read this time and a length of the data to be read this time includes:

V20 of initializing a current offset-address-in-page based on the offset-address-in-page of the data to be read this time;

V30 of searching for and reading a last piece of index log in the index area of the physical page, taking the last piece of index log in the index area as a current piece of index log, executing step V40;

V40 of determining whether the current piece of index log relates to a current offset-address-in-page based on an offset-address-in-page of the written data and a length of the written data in the current piece of index log, executing step V60 if the current piece of index log relates to the current offset-address-in-page; otherwise, executing step V50;

V50 of reading a previous piece of index log of the current piece of index log and taking the previous piece of index log as a current piece of index log, executing step V40;

V60 of reading data starting from the current offset-address-in-page of the data to be read which relates to the current piece of index log from the data area of the physical page based on a storing address of the written data in the current piece of index log, updating the current offset-address-in-page based on the read data, executing step V70;

V70 of determining whether all of the data to be read this time is read, ending reading the Flash data if all of the data to be read this time is read; otherwise, executing V30.

Each physical page is divided into a valid data area and a log area, where determining whether a remaining space of the physical page is sufficient, completing writing data by writing a generated log in the remaining space if the remaining space of the physical page is sufficient includes:

in a case that the physical page is not free, generating a log record according to a preset format based on the data to be written, a length of the data to be written and an offset-address-in-page of the data to be written this time, computing a size of a remaining space of the log area of the physical page, writing the generated log record in the log area of the physical page if the remaining space of the log area of the physical page is determined bigger than a length of the log record;

where the page information of the physical page includes the log record in the log area and valid data in the valid data area of the physical page, the information of the data to be written includes the generated log record completing writing data in the free page found based on the updated information if the remaining space of the log area of the physical page is not bigger than the length of the log record, where organizing page information of the physical page and information of the data to be written to obtain updated information includes:

searching for a new free page, organizing data based on the log record in the log area, the generated log record and the valid data in the valid data area of the physical page, writing the organized data in a valid data area of the free page;

where computing a logical page number of the data to be read this time and an offset-address-in-page of the data to be read this time based on a reading address, searching for a physical page corresponding to the logical page number of the data to be read this time based on the corresponding relation between the logical page number and the physical page number and reading the data to be read this time based on the offset-address-in-page of the data to be read this time and the length of the data to be read this time includes:

step T1 of reading the valid data in the valid data area of the physical page corresponding to the physical page number;

step T2 of reading the log records in the log area of the physical page piece by piece, updating corresponding data in the valid data with the data to be written in the log record based on a first offset-address-in-page in the log record;

step T3, returning data in the updated data, wherein the returned date corresponds to the offset-address-in-page and a reading length of the data to be read this time.

Step S1 includes computing the logical page number and the offset-address-in-page of the data to be written this time based on an update address, generating an updating log based on update data, a length of the update data and the offset-address-in-page of the data to be written this time, searching for a Flash page corresponding to the logical page number in the Flash based on the corresponding relation between the logic number and the physical page number;

where determining whether a remaining space of the physical page is sufficient, completing writing data by writing a generated log in the remaining space if the remaining space of the physical page is sufficient includes:

A2 of determining whether the physical page is a free page, writing the generated update log in the physical page and ending writing the Flash data if the physical page is a free page; or A3 of computing a size of free area of the physical page, determining whether the size of the free area of the physical page is bigger than a length of the generated update log, writing the generated update log in the free area of the physical page if the size of the free area of the physical page is bigger than the length of the generated update log, ending writing the Flash data; otherwise, executing step A4;

where the page information of the physical page includes: the update log in the physical page, the data to be written includes the generated update log, in a case that the size of the free area of the physical page is not bigger than the length of the generated update log, organizing page information of the physical page and information of data to be written to obtain updated information, completing writing data in the free page found based on the updated information includes:

A4 of searching for a new free page in Flash, organizing the update log in the physical page and the generated update log to obtaining true data in the physical page, obtaining a piece of update log based on the true data and writing the piece of update log in the new free page and ending writing the Flash data;

when the data in the physical page is required to be read, the method further includes:

step D2 of initializing a memory space of which a size is the same as a size of the Flash page;

where reading a log in the physical page, reading corresponding data from the physical page based on a storing address of written data and a length of the written data in the read log, updating corresponding data with the read data based on an offset-address-in-page of the written data in the read log includes:

reading update logs in the Flash page piece by piece, replacing corresponding data in the memory space with updated data in the read update log based on the offset-address-in-page of the data to be written this time in the read update log, obtaining true data of the Flash page;

where reading the data to be read this time from the updated data based on the offset-address-in-page of the data to be read this time and a length of the data to be read this time includes:

step D3 of returning data corresponding to the offset-address-in-page and a read length of the data to be read this time, in the true data of the Flash page.

By the method provided in the present invention, efficiency of data update is improved, especially for Flash page, i.e. the physical page is more bigger, capability and lifecycle of the Flash can be greatly promoted in the case that a volume of update data is small at each time.

BRIEF DESCRIPTION OF THE DRAWINGS

The technical solutions of the embodiments of the disclosure are described clearly and completely in conjunction with the accompanying drawings as follows. Apparently, the described embodiments are merely a part of but not all of the embodiments according to the disclosure. Based on the described embodiments of the disclosure, other embodiments obtained by those of ordinary skill in the art without any creative work belong to the scope of the disclosure.

FIG. 2 is a diagram of a physical page in an embodiment of the present invention;

FIG. 3 is a diagram of a physical page that data to be written this time has been written into the physical page as shown in FIG. 2;

FIG. 4 is a diagram of a physical page that a piece of index log generated based on the data to be written this time has been written in the physical page as shown in FIG. 3;

FIG. 5 is another diagram of the physical page of an embodiment of the present invention;

FIG. 6 is a diagram of a free page found by an embodiment of the present invention;

FIG. 7 is a diagram of a free page that valid data of the data area of the physical page has been written in the free page as shown in FIG. 6;

DETAILED DESCRIPTION OF THE EMBODIMENTS

Figure 1:
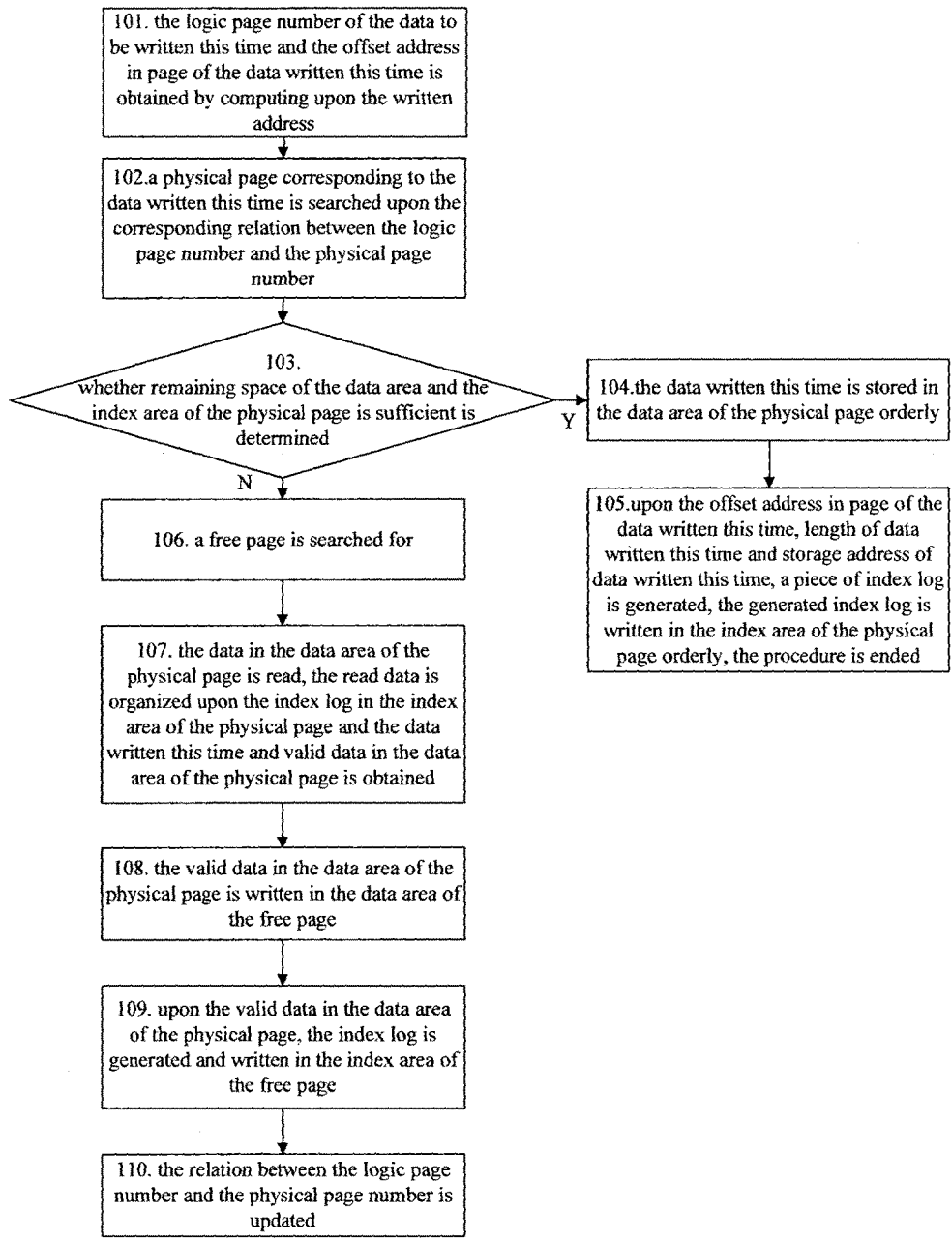
FIG. 1 is a flow diagram of a method for writing Flash data provided by an embodiment of the present invention.

The technical solutions of the embodiments of the disclosure are described clearly and completely in conjunction with the accompanying drawings as follows. Apparently, the described embodiments are merely a part of but not all of the embodiments according to the disclosure. Based on the described embodiments of the disclosure, other embodiments obtained by those of ordinary skill in the art without any creative work belong to the scope of the disclosure.

An embodiment of the present invention provides a method for writing and reading Flash data, where writing the Flash data includes:

S1 of obtaining a logical page number of data to be written this time and an offset-address-in-page of the data to be written this time according to a writing address; searching for a physical page corresponding to the logical page number of the data to be written this time based on a corresponding relation between a logical page number and a physical page number;

S2 of determining whether a remaining space of the physical page is sufficient, completing the writing the Flash data by writing a generated log in the remaining space and finishing writing the Flash data in a case that the remaining space of the physical page is sufficient; otherwise, executing step S3;

S3 of searching for a free page, executing step S4;

S4 of organizing page information of a physical page and information of the data to be written to obtain updated information, completing writing the Flash data in the free page found based on the updated information, executing step S5;

S5 of updating the corresponding relation between the logical page number and the physical page number;

reading Flash data includes:

S10 of when data in a physical page is required to be read, computing a logical page number of data to be read this time and an offset-address-in-page of the data to be read this time based on a reading address, searching for a physical page corresponding to the logical page number of the data to be read this time based on the corresponding relation between the logical page number and the physical page number;

S20 of reading a log in the physical page, reading corresponding data from the physical page based on a storing address of written data and a length of the written data in the read log, updating corresponding data with the read data based on an offset-address-in-page of the written data in the read log;

S30 of reading the data to be read this time from the updated data based on the offset-address-in-page of the data to be read this time and a length of the data to be read this time, finishing the reading Flash data.

The present invention provides a method for writing and reading Flash data. A physical page of Flash is divided into a data area and an index area; the data area is for storing data, the index area is for storing piece of index logs. When data is required to be written in the physical page of Flash, the data is written orderly in the data area of the physical page, and at the same time, a piece of index log is added in the index area of the physical page. When the index area and/or the data area of the physical page is written fully, a free page is found and the found free page is used to replace the physical page. When the data in the physical page of Flash is required to be read, based on the piece of index log of the log area of the physical page, true data in the offset-address-in-page to be read is obtained; the true data is read and returned.

In the present invention, the piece of index log contains an offset-address-in-page of written data, a length of the written data and a storing address of written data. In this case, the offset-address-in-page of written data is an address to which the written data should be written, the storing address of written data is an actual address to which the written data is written.

Referring to FIG. 1, an embodiment of the present invention provides a method for writing Flash data, includes step 101 to step 110.

In step 101, a logical page number of the data to be written this time and an offset-address-in-page of the data to be written this time are obtained by a computation based on a writing address.

For example, in the present embodiment, to write data to a logic address 0x2005 of Flash, the size of the physical page and the size of the logical page are 4 KB respectively, the logical page number of the data to be written this time=|0x2005/0x1000|=2; the offset-address-in-page of the data to be written this time=0x2005−2*0x1000=0x0005.

In step 102, a physical page corresponding to the data to be written this time is searched based on a corresponding relation between a logical page number and a physical page number.

Preferably, in the present embodiment, the corresponding relation between the logical page number and the physical page number is represented by a table mapping of the logical page number and the physical page number. Step 102 includes inquiring the table mapping of the logical page number and the physical page number, obtaining the physical page number corresponding to the logical page number of the data to be written this time, searching for a physical page with the physical page number.

For example, in the present embodiment, the logical page number of the data to be written this time is 2, the table mapping of the logical page number and the physical page number is as the following:

| Logical page number | Physical page number |
|---|---|
| 1 | 1 |
| 2 | 3 |
| ... | ... |

The physical page number corresponding to the logical page number of data to be written this time is 3, the physical page with physical number of 3 is searched in Flash.

In step 103, whether remaining space of the data area and the index area of the physical page is sufficient is determined, if yes, step 104 is executed; otherwise step 106 is executed.

In the present embodiment, determining whether the remaining space of the data area of the physical page is sufficient may include step A1 and step A2.

In step A1, a storing address of the data to be written this time is computed based on the piece of index log in the index area of the physical page.

In the present embodiment, Step A1 specifically includes: searching for the last piece of index log in the index area of the physical page, obtaining the storing address of a written data in the last piece of index log and the length of the written data in the last piece of index log, computing sum of the storing address of written data in the last piece of index log and the length of the written data in the last piece of index log and obtaining the storing address of data to be written this time.

For example, the storing address of the written data in the last piece of index log is 0x000A, the length of the written data is 0x0006; the storing address of the data to be written this time=0x000A+0x0006=0x0010.

Further, in the present embodiment, searching for the last piece of index log in the index area of the physical page specifically includes: traversing the index area of the physical page; when no more than a preset value of consecutive bytes of data, a value of which the value is a preset value, is found, the piece of index log before those bytes data is determined the last piece of index log in the index area of the physical page.

Preferably, in the present embodiment, the preset number is 2, the preset value is 0xFF.

Alternatively, in the present embodiment, the dichotomy is used for searching for the last piece of index log in the index area of the physical page, which specifically includes step a1 to step a4.

In step a1, an initial byte and an end byte of a valid memory space in the index area of the physical page are located; by taking the initial byte as a current start byte, taking the end byte as a current end byte, step a2 is executed.

For example, in the present embodiment, the size of the index area of the physical page is 32 bytes; the valid memory space starts from the first byte of the index area of the physical page; if the length of a piece of index log is 6 bytes, the 32−32 mod 6=30 th bytes is the last bytes of the valid memory space in the index area of the physical page.

In step a2, a middle byte between the current start byte and the current end byte is located and is taken as a current middle byte, step a3 is executed.

For example, the current start byte is the first byte, the current end byte is the 30th byte; then the byte number contained between the current start byte to the current end byte is computed, i.e. 30−1+1=30; then 0+30/2−30/2 mod 6=12, the 12th byte is the middle byte between the current start byte to the current end byte.

In step a3, data with a length of one piece of index log is read backward from one byte after the current middle byte; whether the data read is a piece of index log, if yes, the current middle byte is taken as the current start byte, it's returned to step a2; otherwise, step a4 is executed.

For example, in the present embodiment, the length of the piece of index log is 6 bytes; if the middle byte is the 12th byte, the 13th byte to the 18th byte is read.

In the present embodiment, determining whether the read data is a piece of index log specifically includes: determining whether a value of each byte of the read data is a preset value, if yes, the read data is determined not a piece of index log; otherwise, the read data is determined a piece of index log.

Preferably, in the present embodiment, the preset value is 0xFF.

In step a4, data with a length of one piece of index log is read forward from the current middle byte; whether the read data is a piece of index log is determined, the read data is the last piece of index log of the index area of the physical page if the read data is a piece of index log; otherwise, the current middle byte is taken as the current end byte, it's returned to step a2.

Alternatively, in the present embodiment, searching for the last piece of index log of the index area of the physical page may include step b1 to step b3.

In step b1, an end byte of a valid memory space of the index area of the physical page is located, the end byte is taken as a current byte, step b2 is executed.

For example, in the present embodiment, a size of the index area of the physical page is 32 bytes. In a case that a length of a piece of index log is 6 bytes, the 32−32 mod 6=30th byte is located as the last byte of the valid storage pace of the index area of the physical page.

In step b2, starting from the current byte, data with a length of a piece of index log is read forward from the current byte; whether the read data is a piece of index log is determined, the read data is the last piece of index log of the index area of the physical page if the read data is a piece of index log; otherwise, step b3 is executed.

For example, in the present embodiment, the length of a piece of index log is 6 bytes, if the current byte is the 30th byte, data between the 25th byte to the 30th byte are read.

In the present embodiment, determining whether the read data is a piece of index log may include: determining whether a value of each byte of the read data is a preset value, the read data is not a piece of index log if the value of each byte of the read data is a preset value; otherwise, the read data is a piece of index log.

Preferably, in the present embodiment, the preset value may be 0xFF.

In step b3, a byte before the read data is taken as a current byte, it's returned to step b2.

For example, if the read data is data between the 25th byte to the 30th byte of the index area of the physical page, the 24th byte is taken as the current byte.

In step A2, based on the storing address of the data to be written this time, it's determined whether remaining space of the data area of the physical page is sufficient.

In the present embodiment, step A2 includes: computing a result of adding a storing address of the data to be written this time to a length of the data to be written this time, determining whether a computing result is bigger that the maximum offset-address-in-page of the data area of the physical page, the remaining space of the data area of the physical page is determined not sufficient if the computing result is bigger that the maximum offset-address-in-page of the data area of the physical page; otherwise, the remaining space of the data area of the physical page is determined sufficient.

For example, in the present embodiment, the storing address of the data to be written this time is 0x0010, the length of the data to be written this time is 5 bytes, the size of the area of the physical page is 3 KB, that is the maximum offset-address-in-page of the area of the physical page is 0x0C00, 0x0010+0x0005=0x0015<0x0C00, then the free space of the data area of the physical page is determined sufficient.

Determining whether the remaining space of the index area of the physical page is sufficient includes step B1 and B2.

In step B1, the remaining space of the index area of the physical page is computed.

In the present embodiment, step B1 includes: searching for the last piece of index log of the index area of the physical page; based on an offset address of the end of the last piece of index log, a number of used bytes of the index area of the physical page is obtained; computing a result by using a size of the index area of the physical page minus the number of the used bytes in the index area of the physical page to obtain the remaining space of the index area of the physical page.

For example, the offset address of the end of the last piece of index log in the physical page is 0x0010; the size of the physical page is 1024 bytes; then the number of used bytes in the index of the physical page=0x0010=16; the remain space of the index area of the physical page=1024 bytes-16 bytes=1008 bytes.

The method for searching for the last piece of index log in the index area of the physical page is the same as the method described above, which is not repeated here.

In step B2, whether the remaining space of the index area of the physical page is larger than a length of a piece of index log is determined; the remaining space of the index area of the physical page is sufficient if the remaining space of the index area of the physical page is larger than a length of a piece of index log; otherwise, the remaining space of the physical page is not sufficient.

For example, in the present embodiment, the length of the piece of index log is 6 bytes; if the remaining space of the index area of the physical page is 10 bytes, the remaining space of the index area of the physical page is sufficient.

In step 104, the data to be written this time is stored in the data area of the physical page orderly.

For example, the physical page is shown by FIG. 2. The data in the data area of the physical page is 0x 11 11 11 11 11 22 22 22 22 22 33 33 33 33 33 44 44 44 44 44 55 55 55 55 55; there are 5 pieces of index logs in the index area of the physical page, which are 0x 00 00 00 05 00 00, 0x 00 05 00 05 00 05, 0x 00 00 00 05 00 0A, 0x 00 05 00 05 00 0F and 0x 00 00 00 05 00 14. The data to be written this time, such as 0x 66 66 66 66 66, is stored in the data area of the physical page orderly; the physical page is shown as FIG. 3.

In step 105, based on an offset-address-in-page of the data to be written this time, a length of the data to be written this time and a storing address of the data to be written this time, a piece of index log is generated, the generated piece of index log is written in the index area of the physical page orderly, the procedure is ended.

In the present embodiment, the piece of index log has 6 bytes, the first two bytes indicate the offset-address-in-page of the data to be written this time, the middle two bytes indicate the length of data to be written this time; the last two bytes indicate the storing address of data to be written this time.

For example, the offset-address-in-page of data to be written this time is 0x0005, the length of the data to be written this time is 5 bytes, the storing address of the data to be written this time is 0x0019, then the generated piece of index log is 0x 00 05 00 05 00 19. FIG. 3 shows the physical page which data to be written this time has been written into, FIG. 4 shows the physical page which the generated piece of index log 0x 00 05 00 05 00 19 has been written into.

In step 106, a free page is searched for.

In the present embodiment, the writing data is failed if no free page is found; the procedure is ended.

In step 107, data in the data area of the physical page is read, the read data is organized based on the piece of index log in the index area of the physical page and the data to be written this time and valid data in the data area of the physical page is obtained.

In step 108, the valid data in the data area of the physical page is written a data area of a free page.

In step 109, based on the valid data in the data area of the physical page, a piece of index log is generated and written in an index area of the free page.

Step 107 to step 109 may include step C1 to step C4.

In step C1, a memory space s size of which is the same as the size of the data area of the physical page is initialized.

For example, in the present embodiment, as shown in FIG. 5, the size of the data area of the physical page is 30 bytes; the memory space with the size of 30 bytes is initialized.

In the present embodiment, data in the initialized memory space is 0xFF.

In step C2, a piece of index log in the index area of the physical page is read orderly, reading corresponding data from the data area of the physical page based on a storing address of written data and a length of the written data in the piece of index log; writing the read data in corresponding position of the memory space based on an offset-address-in-page of the written data in the piece of index log.

For example, a current piece of index log is 0x 00 00 00 05 00 0A; data from the 11th byte to the 15th byte, such as 0x 33 33 33 33 33, is read from the data area of the physical page based on the storing address of written data, such as 0x000A, and length of written data, such as 0x0005, in the current piece of index log. The read data 0x 33 33 33 33 33 33 is written into the position between the 1st byte to the 5th byte of the memory space based on the offset-address-in-page of written data, such as 0x0000, in the current piece of index log.

In step C3, writing the data to be written this time in corresponding position of the memory space based on the offset-address-in-page of the data to be written this time.

For example, the data to be written this time is 0x 66 66 66 66 66 66; the offset-address-in-page of the data to be written this time is 0x0005; the data to be written this time 0x 66 66 66 66 66 66 is written into the position between the 6th byte to the 10th bytes of the memory space based on the offset-address-in-page of the data to be written this time, such as 0x0005.

In step C4, the memory space is traversed, once a non-free area is found in the memory space, data in the non-free area is read; the read data is written in the data area of the free page; a piece of index log is generated based on the read data and the piece of index log is written in the index area of the free page.

In the present embodiment, generating a piece of index log based on the read data includes: obtaining the "an offset-address-in-page of the written data" based on the position of the read data in the memory space, obtaining the "a length of written data" based on the length of the read data, obtaining the "a storing address of written data" based on the position of the read data written in the free page and generating the piece of index log containing "an offset-address-in-page of written data", "a length of written data" and "a storing address of written data".

Figures 6, 7:
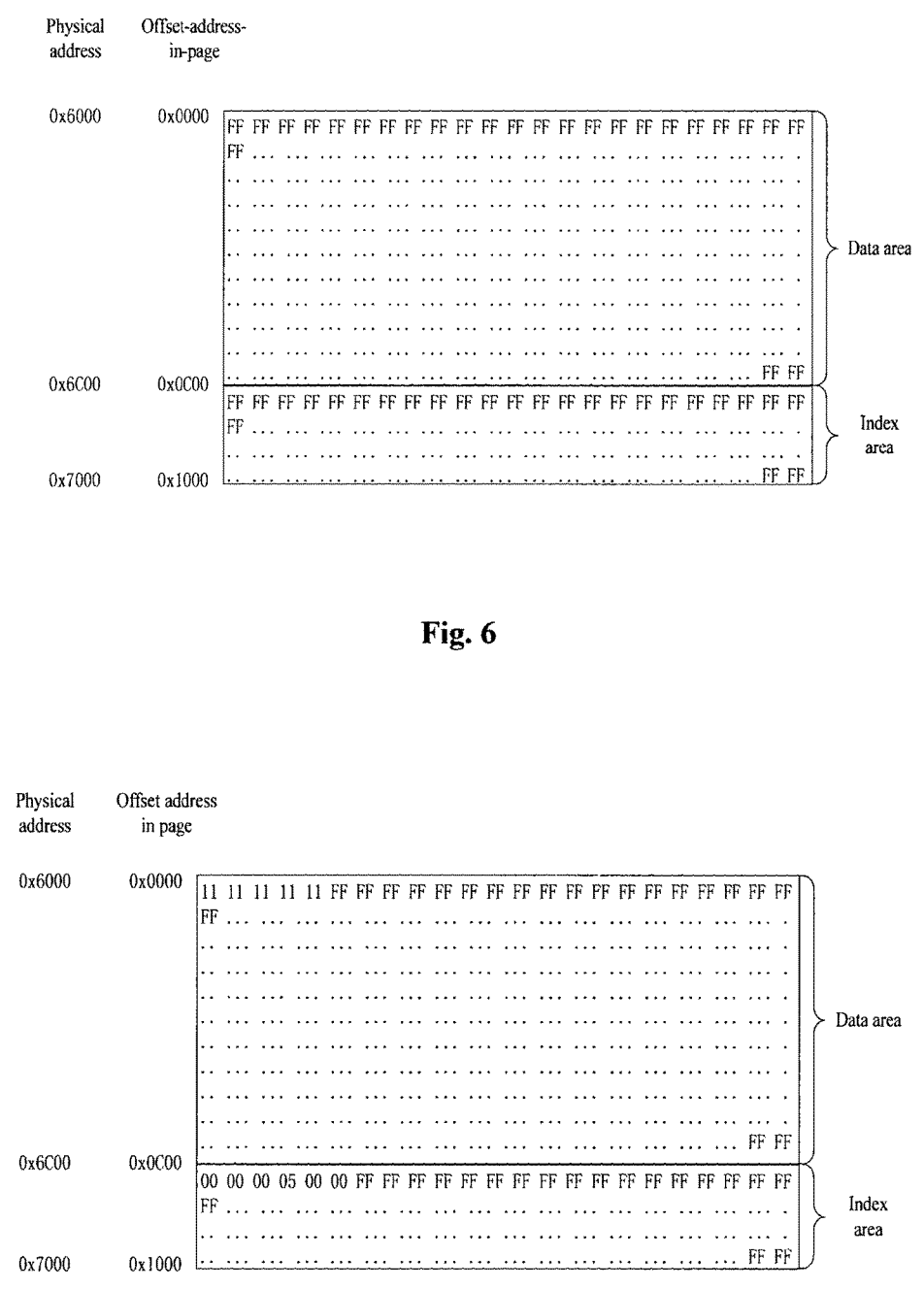
Figure 8:
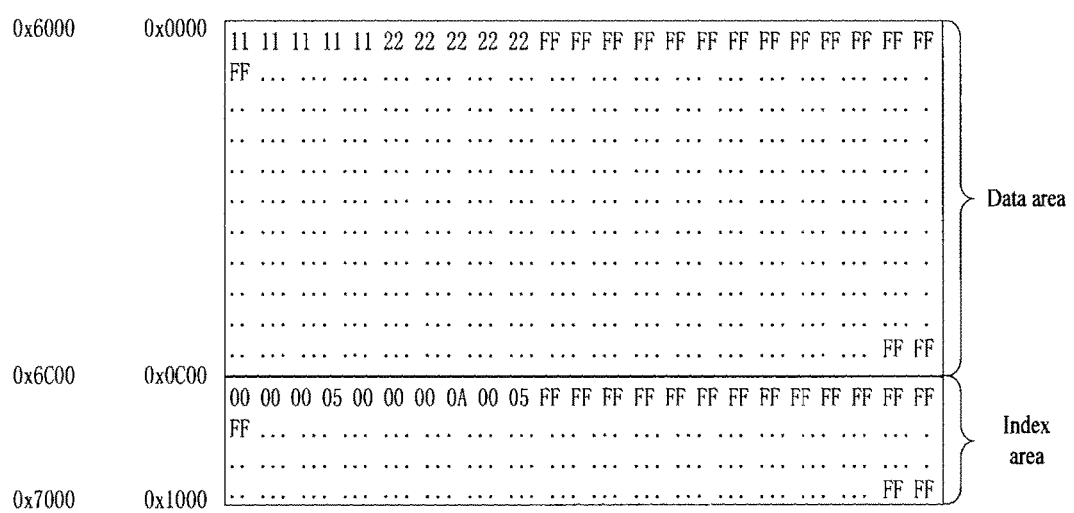
FIG. 8 is a diagram of a free page that a piece of index log generated based on the valid data of the data area of the physical page has been written in the free page as in FIG. 7.

For example, the memory space has two non-free area, i.e. the 1st byte to the 5th byte and the 11th byte to the 15th byte. The data in the two non-free areas are respectively: 0x 11 11 11 11 11 and 0x 22 22 22 22 22; the free page is shown in FIG. 6, the piece of index log generated based on the data in the first non-free area is 0x 00 00 00 05 00 00; the data in the first non-free area is written in the data area of the free page orderly; and after the piece of index log generated based on the data in the first non-free area is written in the index area of the free page, the free page is shown in FIG. 7. The piece of index log generated based on the data in the second non-free area is 0x 00 0A 00 00 00 05; the data in the second non-free area is written in the data area of the free page orderly; and after the piece of index log generated based on the data in the second non-free area is written in the index area of the free page, the free page is shown in FIG. 8.

In step 110, the corresponding relation between logical page numbers and physical page numbers are updated; the method is ended.

In the present embodiment, the corresponding relations between logical page numbers and physical page numbers are presented by a mapping table of the logical page number and the physical page number. Step 110 includes updating the physical page number in the mapping table of the logical page number and the physical page number corresponding to the logical page number obtained in step 101 with the physical page number of the free page.

For example, in the present embodiment, the logical page number obtained in step 101 is 2; the physical page number of the free page is 7; an original mapping table of the logical page number and the physical nape number is shown below.

| Logical page number | Physical page number |
| --- | --- |
| 1 | 1 |
| 2 | 3 |
| . . . | . . . |

The update mapping table of the logical page number and the physical page number is shown below.

| Logical page number | Physical page number |
| --- | --- |
| 1 | 1 |
| 2 | 7 |
| . . . | . . . |

In the present embodiment, flows of processing the physical page after step 110 are not limited by the present patent. In this case, the flows of processing the physical page include but not limited to clearing the data in the physical page to make the physical page a free page; in addition, a power fail safeguard can be set, such as, before step 110, the physical page is updated to be a copy page, then step 110 is executed; after step 110 is executed, the data in the physical page is cleared and the physical page is made the free page.

Figure 9:
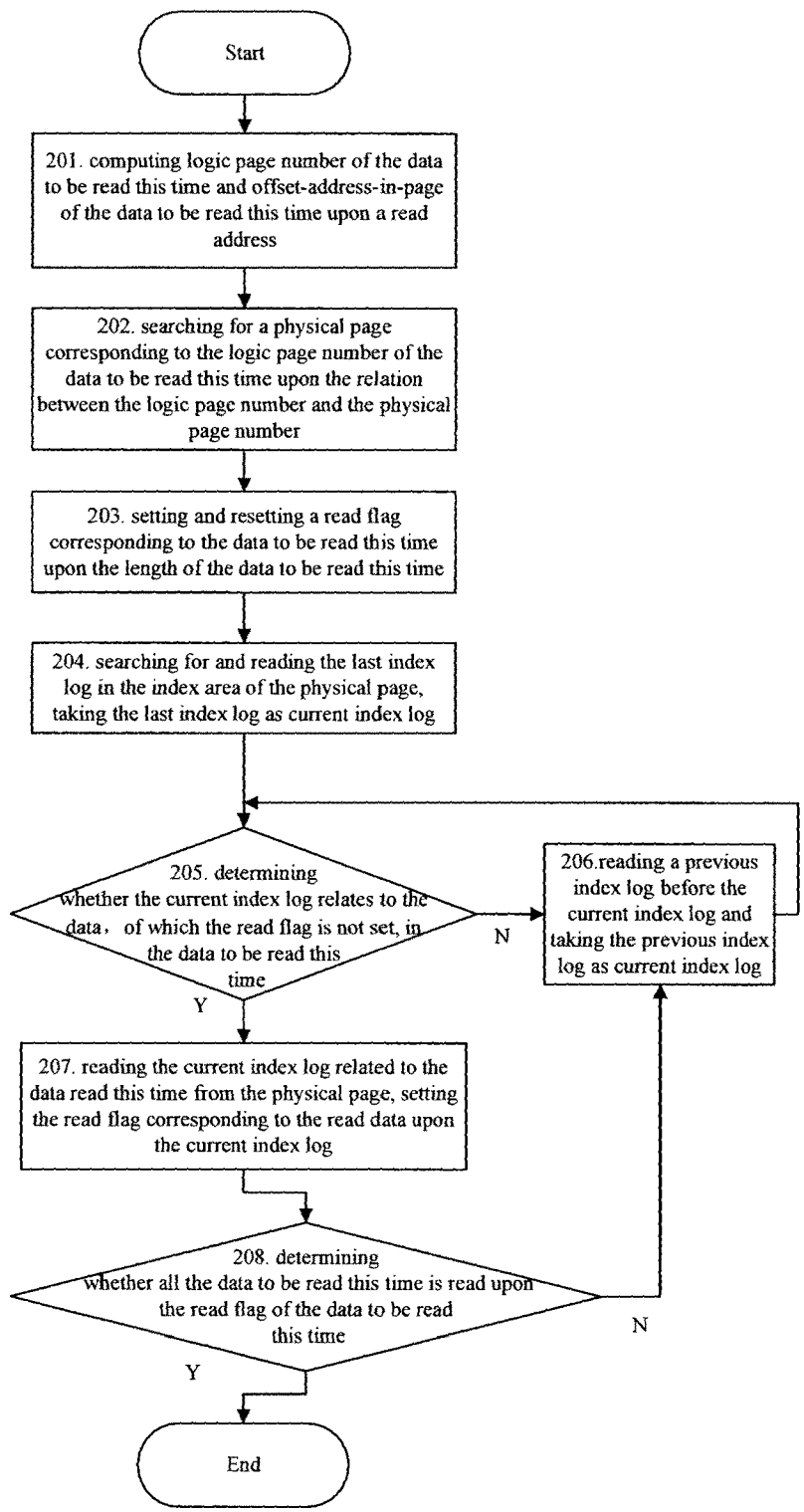
FIG. 9 is a flow diagram of a method for reading Flash data provided by an embodiment of the present invention.

Referring to FIG. 9, the embodiment provides a method for reading Flash data. In the present embodiment, writing Flash data is performed by the method as shown in FIG. 1; the method for reading the Flash data includes step 201 to step 208.

In step 201, a logical page number of the data to be read this time and an offset-address-in-page of the data to be read this time is computed based on a read address.

For example, in the present embodiment, the size of the Flash physical page and the size of the Flash logical page are both 4 KB, the read address is 0x2005, the logical page number of the data to be read this time=10)(2005/0x10001=2; the offset-address-in-page of the data to be read this time=0x2005−2*0x1000=0x0005.

In step 202, a physical page corresponding to the logical page number of the data to be read this time is searched for based on a corresponding relation between a logical page number and a physical page number.

In the present embodiment, the corresponding relation between the logical page number and the physical page number is presented by a mapping table of the logical page number and the physical page number. Step 202 includes: searching a mapping table of the logical page number and the physical page number, obtaining the physical page number corresponding to the logical page number of the data to be read this time, searching for a physical page with the physical page number in the Flash.

For example, in the present embodiment, the logical page number of the data to be read this time is 2, the mapping table of the logical page number and the physical page number is as shown below.

| Logical page number | Physical page number |
| --- | --- |
| 1 | 1 |
| 2 | 3 |
| ... | ... |

Then the physical page number corresponding to the logical page number of the data to be read this time is 3, a physical page of physical page number 3 is searched for in the Flash.

In step 203, a read flag corresponding to the data to be read this time is set and reset based on a length of the data to be read this time.

In the present embodiment, step 203 includes setting and resetting a read flag for each byte data in the data to be read this time.

For example, the length of the data to be read this time is 15 bytes; 15 read flags are set and reset, which correspond to each byte data respectively in the data to be read this time.

Alternatively, in the present embodiment, step 203 includes: setting a main read flag based on the length of the data to be read this time, setting bits in the main read flag as sub-read flags and resetting the sub-read flags, which correspond to each byte data respectively in the data to be read this time.

For example, the length of the data to be read this time is 15 bytes, a main read flag with length of 2 bytes is set; 15 bits in the main read flag are set to be sub-read flags and reset; the 15 bits correspond to each byte data respectively in the data to be read this time.

In step 204, a last piece of index log in the index area of the physical page is searched for and read, the last piece of index log is taken as a current piece of index log.

The method for searching for the last piece of index log in the index area of the physical page is the same as the method in Embodiment 1, which is not repeated here.

In step 205, whether the current piece of index log relates to the data, of which the read flag is not set, in the data to be read this time is determined, step 207 is executed if the current piece of index log relates to the data, of which the read flag is not set, in the data to be read this time; otherwise, step 206 is executed.

In the present embodiment, step 205 includes: computing, based on the offset-address-in-page of the written data and the length of the written data in the current piece of index log, to obtain a range of the offset-address-in-page related by the current piece of index log, determining whether the offset-address-in-page of the data, of which the read flag is not set, in the data to be read this time is in the range of the obtained offset-address-in-page, the current piece of index log relates to the data, of which the read flag is not set, in the data to be read this time if the offset-address-in-page of the data, of which the read flag is not set, in the data to be read this time is in the range of the obtained offset-address-in-page; otherwise, the current piece of index log does not relate to the data, of which the read flag is not set, in the data to be read this time.

For example, the data to be read this time is the data, of which the offset-address-in-page of the physical page is from 0x0005 to 0x0013, and the read flag of each byte of data to be read is not set. The current piece of index log is 0x 00 05 00 05 00 14, the range of the offset-address-in-page related to the current piece of index log obtained by computing based on the offset-address-in-page of the written data and the length of the written data in the current piece of index log is from 0x0005 to 0x0009. Thus, the current piece of index log relates to the data, of which the read flag is not set, with the offset-address-in-page from 0x0005 to 0x0009 in the data to be read this time.

In step 206, a previous piece of index log of the current piece of index log is read and taken as a current piece of index log, it's performed step 205.

For example, the current piece of index log is 0x 00 05 00 05 00 14, the previous piece of index log of the current piece of index log is 0x 00 00 00 05 00 0F; then the piece of index log 0x 00 00 00 05 00 0F is taken as current piece of index log.

In step 207, data to be read this time related to the current piece of index log is read from the physical page, a read flag corresponding to the read data is set based on the current piece of index log.

In the present embodiment, step 207 includes: reading the data to be read this time related to the current piece of index log from the physical page based on the storing address of the written data in the current piece of index log, and a read flag corresponding to the read data is set.

For example, the current piece of index log is 0x 00 05 00 05 00 14; the data to be read this time related to the current piece of index log is the data with offset-address-in-page from 0x0005 to 0x0009 of the physical page; then the data from the 21st byte to the 25th byte is read from the physical page based on the storing address 0x0014 of the written data in the current piece of index log; the data with offset address from 0x0005 to 0x0009 in the physical page is obtained; read flags corresponding to five bytes of data, with which the offset-address-in-page are 0x0005, 0x0006, 0x0007, 0x0008 and 0x0009 respectively, in the data to be read this time are set.

In step 208, determining whether all the data to be read this time is read based on the read flag of the data to be read this time, the procedure is ended if all the data to be read this time is read; otherwise, step 206 is performed.

In the present embodiment, determining whether all the data to be read this time is read includes: determining whether data, of which the read flag is not set, is in the data to be read this time, not all the data to be read this time is read if data, of which the read flag is not set, is in the data to be read this time; otherwise, all the data to be read this time is read.

Alternatively, in the present embodiment, determining whether all the data to be read this time is read includes: determining whether the main read flag is set, all the data to be read this time is read if the main read flag is set; otherwise, not all the data to be read this time is read. In this case, the main read flag is set automatically after all sub-read flags are set.

Figure 10:
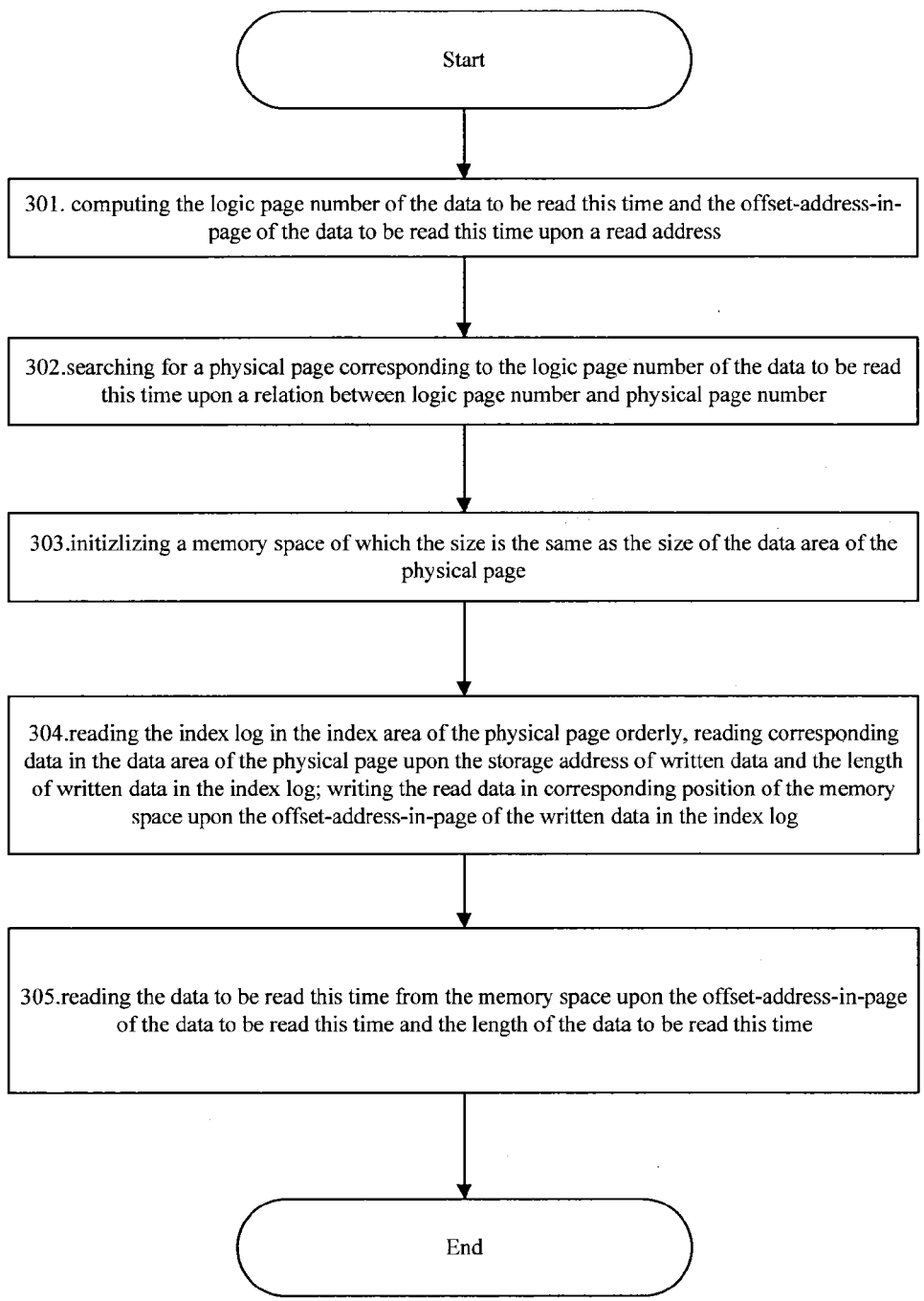
FIG. 10 is a flow diagram of a method for reading Flash data provided by an embodiment of the present invention.

Referring to FIG. 10, the embodiment provides a method for reading Flash data. The Flash data in the present embodiment is written by the method as shown in FIG. 1; the method for reading the data includes step 301 to step 305.

In step 301, a logical page number of data to be read this time and an offset-address-in-page of the data to be read this time is computed based on a read address.

For example, in the present embodiment, the size of the physical page and the size of the logical page of Flash are both 4 KB; the read address is 0x2005; the logical page number of the data to be read this time=|0x2005/0x1000|=2; the offset-address-in-page of the data to be read this time=0x2005−2*0x1000=0x0005.

In step 302, a physical page corresponding to the logical page number of the data to be read this time is searched for based on a corresponding relation between a logical page number and a physical page number.

In the present embodiment, the corresponding relation between the logical page number and the physical page number is presented by a mapping table of the logical page number and the physical page number. Step 302 includes: searching the mapping table of the logical page number and the physical page number to obtain the physical page number corresponding to the logical page number of the data to be read this time; searching for the physical page with the physical page number in the Flash.

For example, in the present embodiment, the logical page number of the data to be read this time is 2; the mapping table of the logical page number and physical page number is shown below.

| Logical page number | Physical page number |
|---|---|
| 1 | 1 |
| 2 | 3 |
| ... | ... |

The physical page number corresponding to the logical page number of the data to be read this time is 3; the physical page, of which the physical page number is 3, is searched for in the Flash.

In step 303, a memory space a size of which is the same as the size of the data area of the physical page is initialized.

For example, in the present embodiment, the size of the data area of the physical page is 30 bytes; then a memory space of which the size is 3072 bytes is initialized.

In the present embodiment, all data in the initialized memory space is 0xFF.

In step 304, a piece of index log in the index area of the physical page is read orderly, corresponding data in the data area of the physical page is read based on a storing address of written data and a length of written data in the piece of index log; the read data is written in corresponding position of the memory space based on an offset-address-in-page of the written data in the piece of index log.

In the present embodiment, step 304 includes step a1 to step a3.

In step a1, a piece of index log in the index area of the physical page is read orderly and is taken as a current piece of index log.

In step a2, corresponding data is read from the data area of the physical page based on a storing address of the written data and a length of the written data in the current piece of index log; the read data is written in corresponding position of the memory space based on an offset-address-in-page of written data in the piece of index log.

For example, the current piece of index log is 0x 00 00 00 05 00 0A; data 0x 33 33 33 33 33, which is from 11th byte to 15th byte, is read from the data area of the physical page based on the storing address of the written data, such as 0x000A and the length of the written data, such as 0x0005 in the current piece of index log. The read data 0x 33 33 33 33 33 33 is written into a position, which is from the 1st byte to the 5th byte, in the memory space based on the offset-address-in-page of written data, such as 0x0000, in the current piece of index log.

In step a3, where there is an unread piece of index log in the index area of the physical page is determined, step a1 is performed if there is an unread piece of index log in the index area of the physical page; otherwise, step 305 is executed.

In step 305, the data to be read this time is read from the memory space based on the offset-address-in-page of the data to be read this time and the length of the data to be read this time; the method is ended.

For example, the offset-address-in-page of the data to be read this time is 0x0005; the length of the data to be read is 5 bytes; then the data from the 6th byte to the 10th byte in the memory space is read to obtain the data to be read this time.

Figure 11:
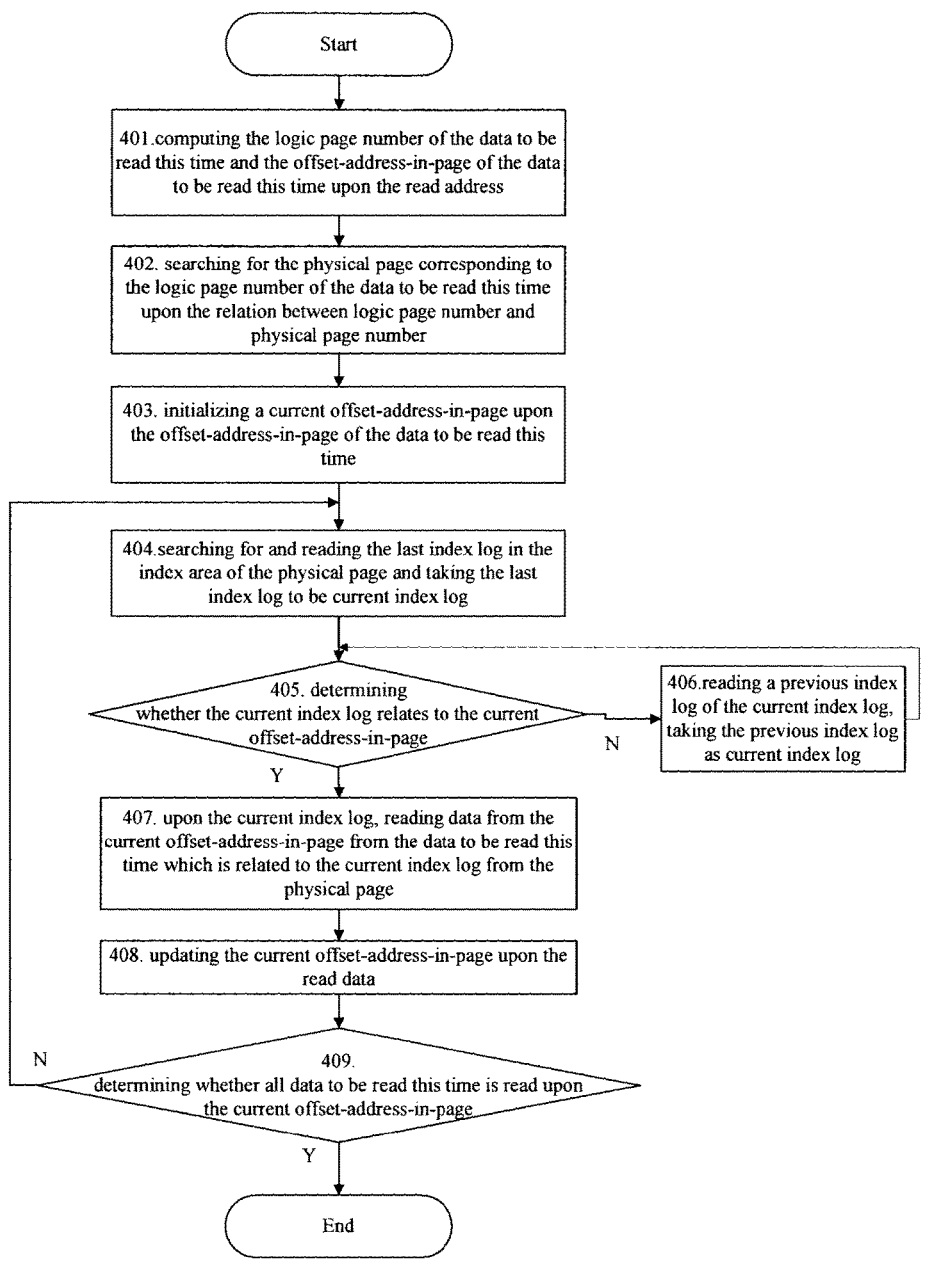
FIG. 11 is a flow diagram of a method for reading Flash data provided by an embodiment of the present invention.

Referring to FIG. 11, an embodiment provides a method for reading Flash data. The Flash data in the present embodiment is written by the method as shown in FIG. 1; the method for reading data includes step 401 to step 409.

In step 401, a logical page number of data to be read this time and an offset-address-in-page of the data to be read this time is computed based on a read address.

For example, in the present embodiment, the size of the physical page and the size of logical page of the Flash are both 4 KB; the read address is 0x2005; the logical page number of the data to be read this time=|0x2005/0x1000|=2; the offset-address-in-page of the data to be read this time=0x2005−2*0x1000=0x0005.

In step 402, a physical page corresponding to the logical page number of the data to be read this time is searched for based on a corresponding relation between a logical page number and a physical page number.

In the present embodiment, the corresponding relations between logical page numbers and physical page numbers are presented by a mapping table of the logical page number and the physical page number. Step 302 includes: searching the mapping table of the logical page number and the physical page number to obtain a physical page number corresponding to the logical page number of the data to be read this time; searching for a physical page with the physical page number in the Flash.

For example, in the present embodiment, the logical page number of the data to be read this time is 2; the mapping table of the logical page number and the physical page number is shown below.

| Logical page number | Physical page number |
|---|---|
| 1 | 1 |
| 2 | 3 |
| ... | ... |

The physical page number corresponding to the logical page number of the data to be read this time is 3; a physical page with page number of 3 is searched for in the Flash.

In step 403, a current offset-address-in-page is initialized based on an offset-address-in-page of the data to be read this time.

In the present embodiment, a current offset-address-in-page is initialized as the offset-address-in-page of the data to be read this time.

In this present embodiment, step 403 may further include: initializing a current count.

In the present embodiment, the current count is initialized to be a length of the data to be read this time or to be 0.

For example, the offset-address-in-page of the data to be read this time is 0x0005; the length of the data to be read this time is 15 bytes; then the current offset-address-in-page of the current page is initialized to be 0x0005; the current count is initialized to be 15 or 0.

In step 404, a last piece of index log in the index area of the physical page is searched for and read and taken as a current piece of index log.

The method for searching for the last piece of index log in the index area of the physical page is the same as the method of embodiment 1, which is not repeated here.

In step 405, determining whether the current piece of index log relates to the current offset-address-in-page; step 407 is executed if the current piece of index log relates to the current offset-address-in-page; otherwise, step 406 is executed.

In the present embodiment, step 405 includes: computing, based on an offset-address-in-page of the written data and a length of written data in the current piece of index log, to obtain a range of an offset-address-in-page related to the current piece of index log, determining whether the current offset-address-in-page is in the range of the offset-address-in-page obtained by computing, the current piece of index log relates to the current offset-address-in-page if the current offset-address-in-page is in the range of the offset-address-in-page obtained by computing; otherwise, the current piece of index log does not relate to the current offset-address-in-page.

For example, if the current piece of index log is 0x 00 05 00 05 00 14, data related to the current piece of index log, which is the data from the offset address 0x0005 to the offset address 0x0009 in the physical page, is obtained by computing based on the offset-address-in-page 0x0005 of the written data and the length 0x0005 of the written data in the current piece of index log; if the current offset-address-in-page is in the range from 0x0005 to 0x0009, the current piece of index log relates to the current offset-address-in-page; if the current offset-address-in-page is not in the range from 0x0005 to 0x0009, the current piece of index log does not relate to the current offset-address-in-page.

In step 406, a previous piece of index log of the current piece of index log is read and taken as a current piece of index log and step 405 is executed.

In step 407, based on the current piece of index log, data, from the current offset-address-in-page is read from the data to be read this time, which is related to the current piece of index log, in the physical page.

In the present embodiment, step 407 includes: reading the data related to the current piece of index log in the data to be read this time from the physical page based on the storage address of the written data in the current piece of index log.

For example, the current piece of index log is 0x 00 05 00 05 00 14; the data related to the current piece of index log in the data to be read this time is the data from the offset-address-in-page 0x0005 to the offset-address-in-page 0x0009 in the physical page. Data from the 21st byte to the 25th byte is read from the physical page based on the storing address 0x0014 of the written data in the current piece of index log and data from the offset-address-in-page 0x0005 to the offset-address-in-page 0x0009 of the physical page is obtained.

In step 408, the current offset-address-in-page is updated based on the read data.

In the present embodiment, the current offset-address-in-page is updated to be a next offset address in page of the offset-address-in-page of the last byte of data in the read data.

In the present embodiment, step 408 further includes: updating a current count based on the read data.

In the present embodiment, the current count is updated to be a result of a current value of the current count minus a length of the read data or the current count is updated to be a result of the current value of the current count plus the length of the read data For example, the current offset-address-in-page is 0x0000; the current count is 15 or 0; the range of the offset-address-in-page of the read data is from 0x0005 to 0x0009; then the current offset-address-in-page is updated to be 0x000A; the current count is updated to be 10 or 5.

In step 409, whether all data to be read this time is read is determined based on the current offset-address-in-page, the method is ended if all data to be read this time is read; otherwise, step 404 is executed.

In the present embodiment, based on the current offset-address-in-page, determining whether all the data to be read this time is read includes: computing a result of the offset-address-in-page of the data to be read this time plus the length of the data to be read this time; determining whether the result is less than the current offset-address-in-page, all the data to be read this time is read if the result is less than the current offset-address-in-page; otherwise, not all the data to be read this time is read.

Alternatively, in the present embodiment, whether all the data to be read is read also may be determined based on the current count, the method is ended if all the data to be read is read; otherwise, step 404 is executed.

In the present embodiment, determining whether all the data to be read is read based on the current count includes: determining whether the current count equals to 0 or determining whether the current count equals to the length of the data to be read this time; all the data to be read is read if the current count equals to 0 or the length of the data to be read this time; otherwise, not all the data to be read is read.

For example, the offset-address-in-page of the data to be read this time is 0x0005; the length of the data to be read this time is 15 bytes, that is, the computing result of a sum of the offset-address-in-page of the data to be read this time and the length of the data to be read this time is 0x0013. Then whether the current offset-address-in-page is more than 0x0013 is determined; all the data to be read is read if the current offset-address-in-page is more than 0x0013; otherwise, not all the data to be read is read.

The present invention provides a method for updating and reading data of a big page Flash. A part of a redundancy area of the physical page of the Flash is taken as a log area. When the data in the physical page is required to be updated, a piece of log record, which records a content required to be updated this time, is added in the log area. When the log area is written fully, a new free page is searched for and the physical page is updated with the found free page. When the data in the physical page is required to be read, a content of the data area is read first, then, the read data content is updated based on the log record in the log area.

Figure 12:
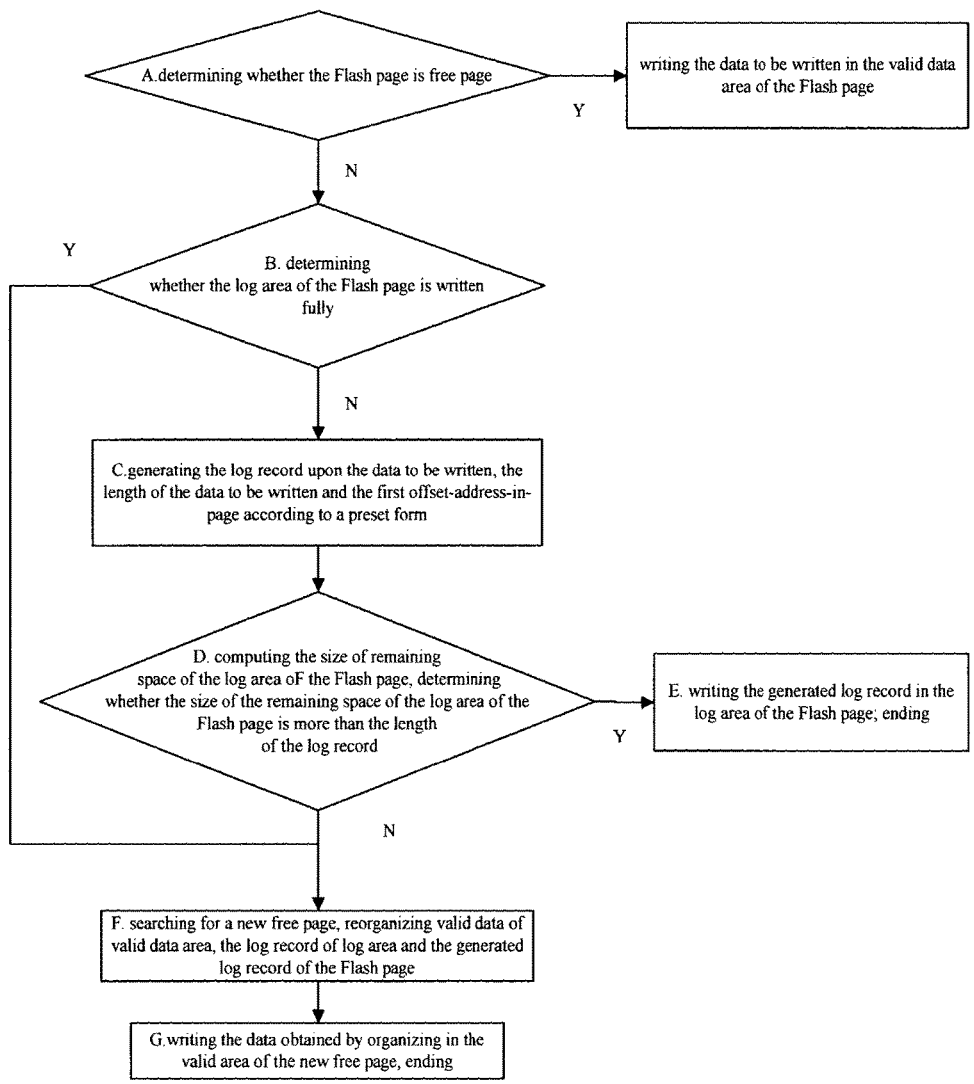
FIG. 12 is a flow diagram of a method for writing Flash data provided by an embodiment of the present invention.

Referring to FIG. 12, an embodiment of the present invention provides a method for updating data of Flash based on big page. In this method, each Flash page of the Flash of a big page, i.e. a physical page, is divided input a valid data area and a log area. For example, for a page with 4 KB, 3 KB is for the valid data area, the rest 1 KB redundancy area is taken as the log area. When data (which is called as data to be written) is written into the big page Flash, a write function is invoked; the data to be written, a length of the data to be written and a writing address of the data to be written (writing address is a logic address), is transferred into the write function; the write function computes a logical page number and a offset-address-in-page of a first page based on the writing address; the first page is a page on which the data to be written this time; a physical page number corresponding to the logical page number is searched in a mapping table of the logical page number and the physical page number; an operation of writing data to be written into a Flash page corresponding to the physical page. The operation of writing the data to be written includes step A to step G.

In step A, whether the Flash page is free is determined, the data to be written is written in the valid data area of the Flash page if the Flash page is free, and the method is ended; otherwise, step B is executed.

Determining whether the Flash page is free page includes: searching the log area of the Flash page, determining whether a non-free flag of the log area is set, the Flash page is not free page if the non-free flag of the log area is set; otherwise, the Flash page is free page.

In a case that the Flash page is free page, writing the data to be written in the valid data area of the Flash page further includes: setting the non-free flag in the log area of the Flash page;

For example, in the present embodiment, a first two bytes of the log area are set as non-free flag. In a case that the value of the first two bytes of the log area is 0x5AA5, it indicates that the non-free flag is set; when the value of the first two bytes is not 0x 5AA5, it indicates that the non-free flag is reset.

Alternatively, determining whether the Flash page is free includes: reading data of a preset number of bytes of data from a start address in the Flash page, determining whether the read data at each byte is 0xFF, the Flash page is free page if the read data at each byte is 0xFF; otherwise, the Flash page is not free page. In this case, the preset number of bytes is a plurality of bytes, i.e. two or more than two bytes usually.

For example, data of two bytes from the start address in the Flash page is read; the Flash page is free page if the read data is 0xFFFF; otherwise, the Flash page is not free page.

Alternatively, determining whether the Flash page is free page includes: reading the data of a preset number of bytes starting from a first offset-address-in-page of the Flash page; determining whether the read data at each byte is 0xFF, the Flash page is free page if the read data at each byte is 0xFF; otherwise, the Flash page is not free page. In this case, the preset number of bytes is a plurality of bytes, i.e. two or more than two bytes usually.

For example, in the present embodiment, reading data of three bytes starting from the first offset-address-in-page of the Flash page; the Flash page is free page if the read data is 0xFFFFFF.

In step B, whether the log area of the Flash page is fully written is determined, executing step F is executed if the log area of the Flash page is fully written; otherwise, step C is executed.

Determining whether the log area of the Flash page is fully written includes step B1 to step B2.

In step B1, a number of used bytes in the log area is computed.

Step B1 includes traversing the log area of the Flash page, recording a length of each log record; when at least two consecutive bytes of 0xFF is found, computing a sum of lengths of log records to obtain the number of used bytes of the log area.

In step B2, whether the number of used bytes of the log area reaches a size of the log area is determined, if yes, the log area is fully written if the number of used bytes of the log area reaches the size of the log area; otherwise, the log area is not fully written.

For example, in the present embodiment, the size of the log area is 1 KB, i.e. 1024 bytes; when the number of used byte of the log area reaches 1024 bytes, it indicates that the log area is fully written; when the number of the used bytes of the log area does not reach 1024 bytes, it indicates that the log area is not fully written.

Further, Step B may be omitted and step C is executed directly in the present embodiment.

In step C, a log record is generated based on the data to be written, a length of the data to be written and a first offset-address-in-page according to a preset format.

The preset format is a length of the data to be written+a first offset-address-in-page+the data to be written.

In the present embodiment, two bytes of data indicate the length of the data to be written, two bytes of data indicate the first offset-address-in-page; for example, if the first offset-address-in-page is 0x0400, the data to be written is 0x 31 32 33 34 35 36, the generated log record to be added is 0x 00 06 04 00 31 32 33 34 35 36.

In step D, a size of a remaining space of the log area of the Flash page is computed, whether the size of the remaining space of the log area of the Flash page is bigger than the length of the log record, step E is executed if the size of the remaining space of the log area of the Flash page is bigger than the length of the log record; otherwise step F is executed.

Computing the remaining space of the log area of the Flash page includes: traversing log area of the Flash page, recording a length of each log record, when at least two consecutive bytes of 0xFF are found, computing a sum of lengths of log records, obtaining a number of used bytes of the log area; obtaining the size of the remaining space of the log area by deducting the number of used bytes from the size of the log area.

In the present embodiment, two bytes of data indicate the length of the data to be written, two bytes of data indicate the offset-address-in-page; the length of log record equals to the length of the data to be written plus 4 bytes. For example, if the length of the data to be written is 6 bytes, the length of the log record to be added is 10 bytes.

In step E, the generated log record is written in the log area of the Flash page, the method is ended.

In step F, a new free page is searched for, valid data of the valid data area, a log record of the log area and the generated log record of the Flash page are reorganized.

Figure 13:
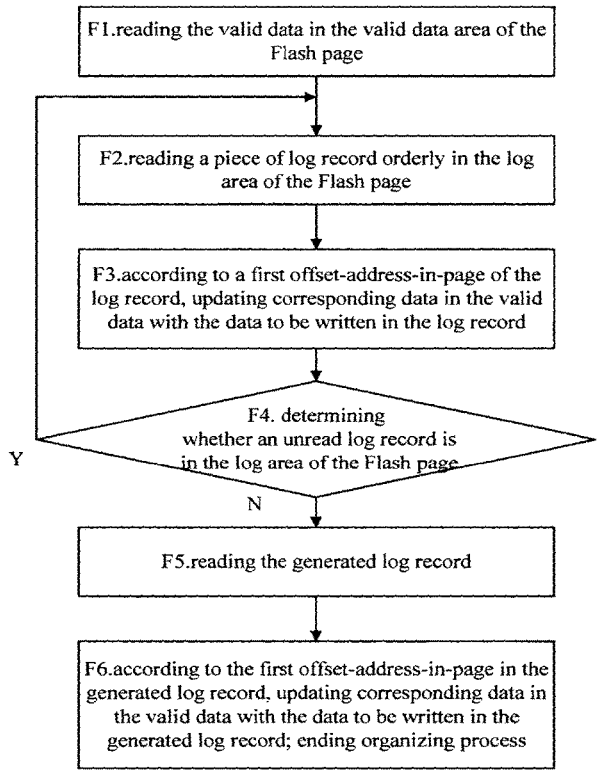
FIG. 13 is flow diagram of a method for reorganizing data of the valid data area and the log area of the Flash page, e.g. physical page of FIG. 12.

Referring to FIG. 13, in the present embodiment, reorganizing the valid data of the valid data area, the log record of the log area and the generated log record of the Flash page includes step F1 to step F6.

In step F1, the valid data in the valid data area of the Flash page is read.

In step F2, a piece of log record in the log area of the Flash page is read orderly.

In step F3, according to a first offset-address-in-page of the log record, corresponding data in the valid data is updated with the data to be written in the log record.

For example, if the read log record is 0x 00 06 04 00 31 32 33 34 35 36, then the data from the 1025th byte to the 1030th byte in the valid data is updated to be 0x 31 32 33 34 35 36.

In step F4, where there is an unread log record in the log area of the Flash page is determined, step F2 is executed if there is an unread log record in the log area of the Flash page; otherwise, step F5 is executed.

Determining whether there is an unread log record in the log area of the Flash page includes: determining whether there are at least two bytes of 0xFF after the log record, there is not an unread log record in the log area of the Flash page if there are at least two bytes of 0xFF after the log record; otherwise, there is an unread log record is in the log area of the Flash page.

In step F5, the generated log record is read.

In step F6, according to a first offset-address-in-page in the generated log record, corresponding data in the valid data is updated with data to be written in the generated log record, and the organizing process is ended.

In the present embodiment, step F further includes replacing the physical page number of the Flash page in the mapping table of the logical page number and the physical page number with the physical page number of new free page.

In step G, data obtained by organizing is written in the valid data area of the new free page; the method is ended.

In the present embodiment, if the non-free flag is used for identify whether the current page is a free page or not, writing the data to be written in the valid data area of the new free page further includes setting the non-free flag in the new free page.

Figure 14:
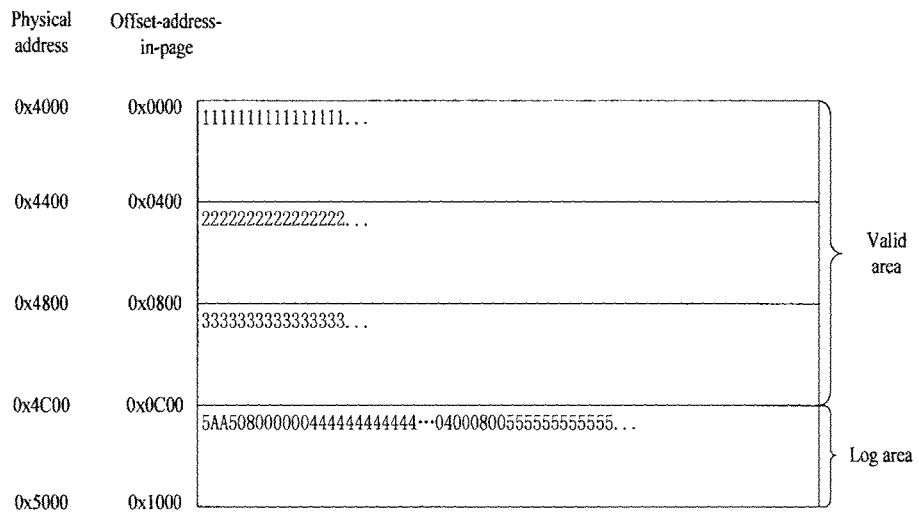
FIG. 14 is a flow diagram of a page of the Flash page of an embodiment of the present invention.
Figure 15:
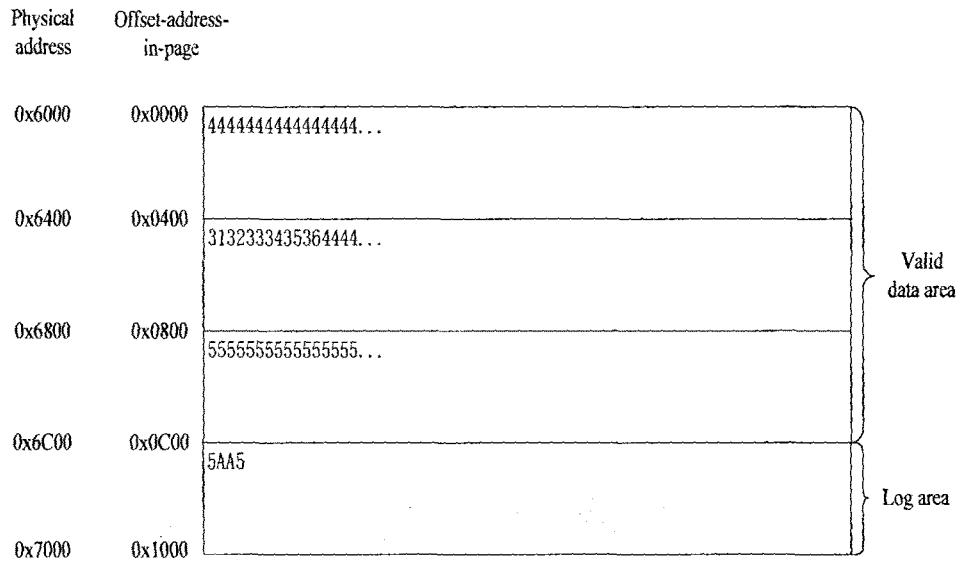
FIG. 15 is a diagram of a page of new free page after that the data obtained by organizing in an embodiment of the present invention.

For example, referring to FIG. 14, in the present embodiment, the start address of the Flash page is 0x4000; the size of the Flash page is 4 KB; the valid data area of the Flash page is an area corresponding to addresses from 0x4000 to 0x5000; the size of the valid data area is 3 KB; the log area of the Flash page is an area corresponding to addresses from 0x5000 to 0x5400. The data of the valid data area is 0x 11 11 11 11 11 ... (1024 bytes of 11 in total), 22 22 22 22 22 ... (1024 bytes of 22 in total), 33 33 33 33 33 ... (1024 bytes of 33 in total); the data in the log area is 0x 5A A5 08 00 00 00 44 44 44 44 44 44 ... (2048 bytes of 44 in total), 04 00 08 00 55 55 55 55 55 55 ... (2048 bytes of 55 in total); that is, there are two pieces of records in the log area: 0x 08 00 00 00 44 44 44 44 44 44 ... and 0x 04 00 08 00 55 55 55 55 55 55 .... The log record generated in updating data process this time is 0x 00 06 04 00 31 32 33 34 35 36. The data, obtained by reorganizing the valid data in the valid data area, the log record in the log area and the generated log record, is: 0x 44 44 44 44 44 ... (1024 bytes of 44 in total), 31 32 33 34 35 36 44 44 44 44 44 44 ... (1018 bytes of 44 in total), 55 55 55 55 55 ... (1024 bytes of 55 in total). The start address of the found new free page is 0x6000; after the data obtained by organizing is written in the valid data area of the free page, the data in the new free page is shown as FIG. 15.

Figure 16:
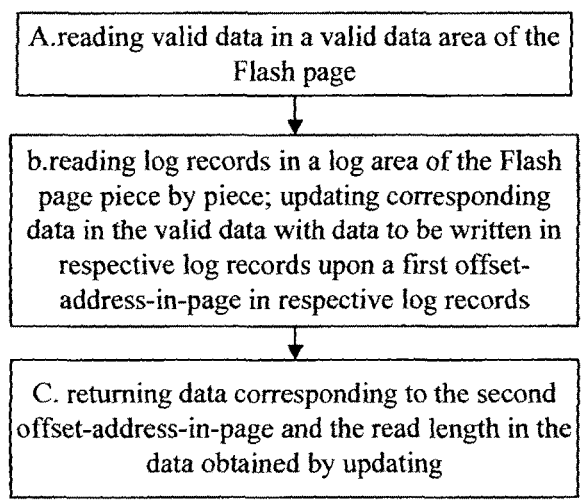
FIG. 16 is a flow diagram of a method for reading Flash data provided by an embodiment of the present invention.

Referring to FIG. 16, one embodiment provides a method for reading data based on big page Flash; data of the big page Flash is updated by the method provided in the embodiment. When the data of the big page Flash is read, a read function is invoked, a read address (the read address is a logic address), and a read length are transferred in a read function. The read function computes a logical page number and an offset-address-in-page of a second page; the second page is the page in which data to be read this time; a physical page number corresponding to the logical page number is searched for in a mapping table of the logical page number and the physical page number; operation of reading the data in the Flash page corresponding to the physical page number is operated; the operation includes step a to step c.

In step a, valid data in a valid data area of the Flash page is read.

In step b, log records in a log area of the Flash page are read piece by piece; corresponding data in the valid data is updated with data to be written in log records based on a first offset-address-in-page in each log record.

Figure 17:
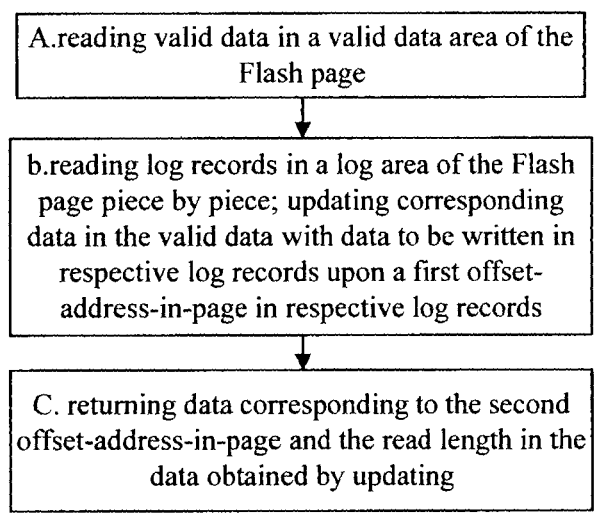
FIG. 17 is a flow diagram of a specific method of step b in FIG. 16.

Referring to FIG. 17, in the present embodiment, step b includes step b1 to step b2.

In step b1, a piece of log record in the log area of the Flash page is read orderly.

In step b2, based on the first offset-address-in-page in the log record, corresponding data in the valid data in the log record is updated with the data to be written.

For example, in the present embodiment, the valid data read from the valid data area of the Flash page is 0x 11 11 11 11 11 11 ... (1024 bytes of 11 in total), 22 22 22 22 22 22 ... (1024 bytes of 22 in total), 33 33 33 33 33 33 ... (1024 bytes of 33 in total). If one piece of log record read is 0x 00 06 04 00 31 32 33 34 35 36, the data from the 1025th byte to 1030th byte in the valid data is updated to be 0x 31 32 33 34 35 36; the valid data after updating is 0x 11 11 11 11 11 11 ... (1024 bytes in total), 31 32 33 34 35 36 22 22 ... (1018 bytes of 22 in total), 33 33 33 33 33 33 ... (1024 bytes in total).

In step b3, whether there is an unread log record in the log area of the Flash page is determined, step b1 is executed if there is an unread log record in the log area of the Flash page; otherwise, step c is executed.

Determining whether there is a log record is in the log area of the Flash page includes: determining whether there are at least two bytes of 0xFF after the log record, no unread log record is in the log area of the Flash page if there are at least two bytes of 0xFF after the log record; otherwise, there is an unread log record is in the log area of the Flash page.

In step c, data corresponding to a second offset-address-in-page and a read length in the data obtained by updating is returned.

For example, the data obtained by updating is 0x 11 11 11 11 11 11 ... (1024 bytes in total), 31 32 33 34 35 36 22 22 ... (1018 bytes of 22 in total), 33 33 33 33 33 33 ... (1024 bytes in total). If the offset-address-in-page is 0x0002, the read length is 8 bytes; then the data from the 3rd byte to the 10th byte in the data obtained by updating is returned.

The present invention provides a method for updating and reading data based on the big page Flash. A whole physical page of Flash is taken as a log area and is used for storing updated logs. When data in the physical page is required to be updated, an update log which records data to be written this time or a content to be updated in the physical page; when the physical page is fully written, a new free page is searched for and the physical page is replaced with the found new free page; when data in the physical page is required to be read, logs in the physical page is read piece by piece; true data in the physical page is obtained by arranging and a content to be read is returned.

Figure 18:
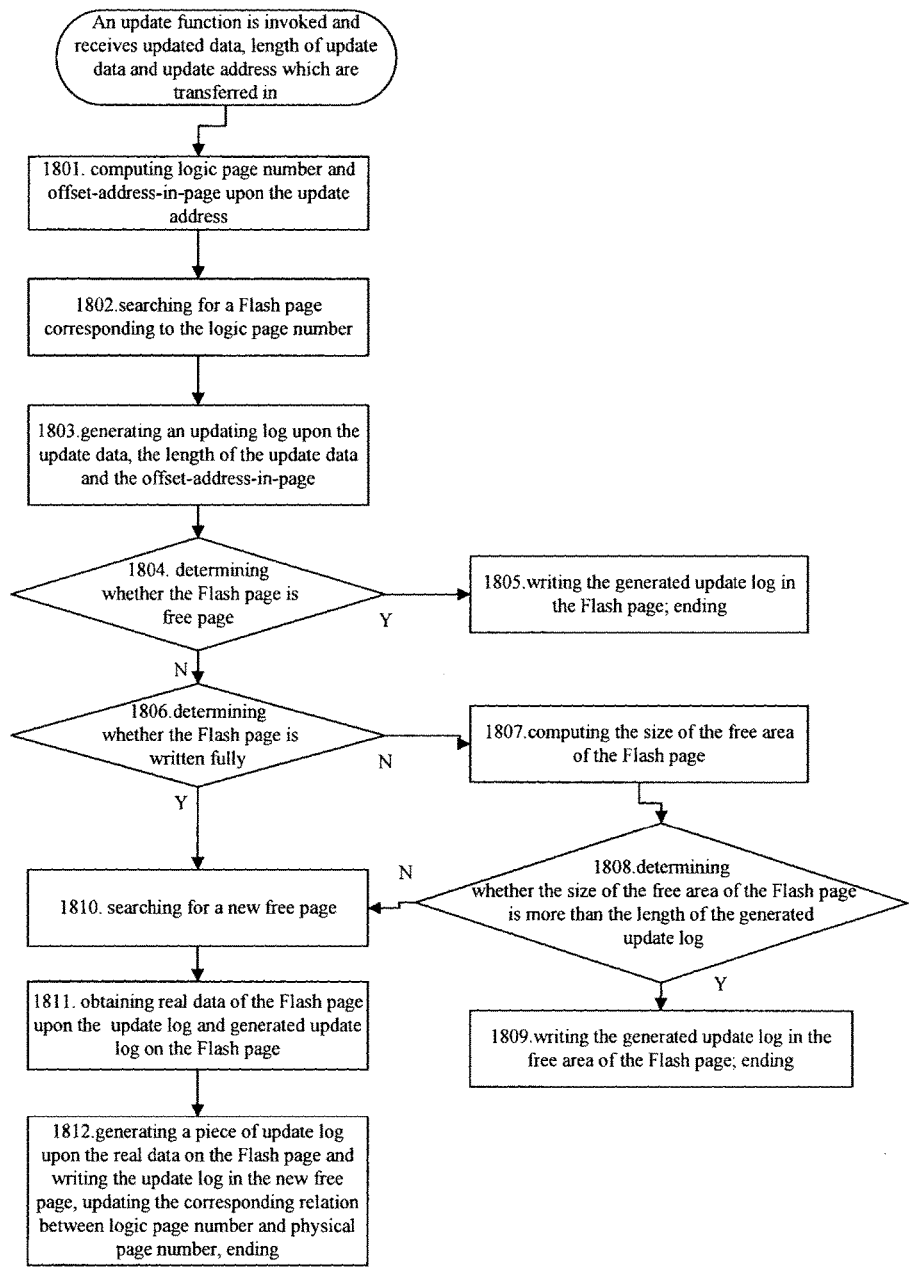
FIG. 18 is a flow diagram of a method for writing Flash data provided by an embodiment of the present invention.

Referring to FIG. 18, one embodiment of the present invention provides a method for updating data based on big page Flash, which includes invoking an update function, transferring update data, a length of the update data and an update address (update address is a logic address) in the update function; after the update function receives the update data, the length of update data and the update address which are transferred in, steps 1801 to 1812 are operated.

In step 1801, a logical page number and an offset-address-in-page is computed based on an update address.

For example, in the present embodiment, both the sizes of the physical page and the logical page are 410. The update address is 0x1400; logical page number=|0x1400/0x1000|=1; the offset-address-in-page=0x1400−1*0x1000=0x0400.

In step 1802, a Flash page corresponding to the logical page number is searched for.

In the present embodiment, step 1802 includes: searching for the Flash page corresponding to the logical page number in the Flash based on a corresponding relation between an logical page number and a physical page number.

In the present embodiment, step 1802 includes searching a mapping table of the logical page number and the physical page number, obtaining the physical page number corresponding to the logical page number; searching for the physical page corresponding to the physical page number in the Flash and obtaining the Flash page corresponding to the logical page number.

In step 1803, an updating log is generated based on the update data, the length of the update data and the offset-address-in-page.

In the present embodiment, step 1803 includes: generating the update log based on a format of "a length of update data+an offset-address-in-page+update data".

In the present embodiment, two bytes of data indicate the length of the update data; two bytes of data indicate the offset-address-in-page.

For example, in the present embodiment, if the offset-address-in-page is 0x0400, the update data is 0x 31 32 33 34 35 36, then the generated update log is 0x 00 06 04 00 31 32 33 34 35 36.

In the present embodiment, a check bit can be set at the end of the update log.

In addition, in the present embodiment, a sequence between step 1802 and step 1803 can be changed.

In step 1804, whether the Flash page is a free page is determined, step 1805 is executed if the Flash page is a free page; otherwise, step 1806 is executed.

In the present embodiment, determining whether the Flash page is a free page includes:

reading data of a first preset number of bytes from the start address on the Flash page, determining whether a value of data read at each byte is a preset value, the Flash page is a free page if the value of the data read at each byte is the preset value; otherwise, the Flash page is not a free page.

In the present embedment, the first preset number of bytes of data is two bytes of data; the preset value is 0xFF.

For example, in the present embodiment, two bytes of data from the start address is read from the Flash page, the Flash page is a free page if the read data is 0xFFFF; otherwise, the Flash page is not a free page.

In step 1805, the generated update log is written in the Flash page; the method is ended.

Figure 19:
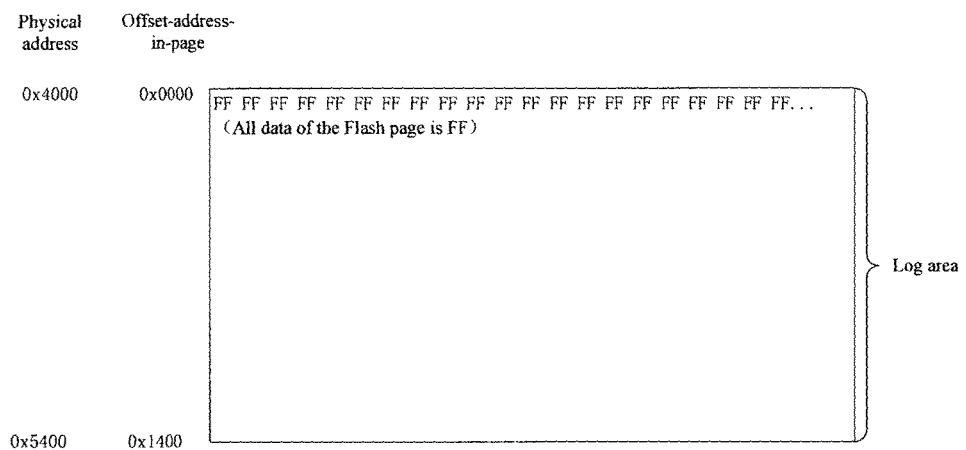
FIG. 19 is a diagram of a Flash page which is a free page in an embodiment of the present invention.
Figure 20:
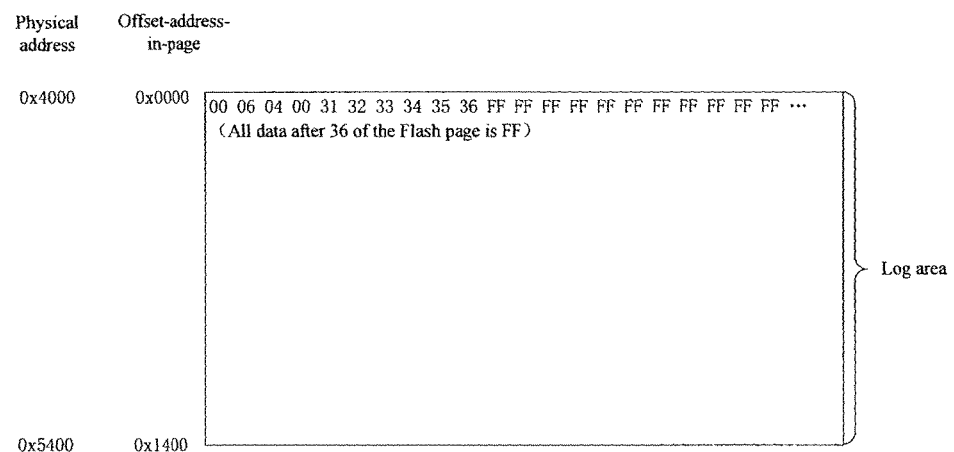
FIG. 20 is a diagram of a Flash page that an update log is written in the Flash page as shown in FIG. 19.

For example, in the present embodiment, the Flash page is shown as a free page shown in FIG. 19; the generated update log is 0x 00 06 04 00 31 32 33 34 35 36; after the generated update log is written in the Flash page, the Flash page is shown in FIG. 20.

In step 1806, whether the Flash page is fully written is determined, step 1810 is executed if the Flash page is fully written; otherwise, step 1807 is executed.

In the present embodiment, determining whether the Flash page is fully written includes steps 1806-1 to 1806-2.

In step 1806-1, a number of used bytes of the Flash page is computed.

Step 1806-1 includes: traversing the Flash page, recording a length of each update log of the Flash page; when no less than a second preset number of byte data, of which a value is a preset value, is found, computing a sum of lengths of update logs to obtain the number of bytes used of the Flash page.

The second preset number of bytes is two, and the preset value of the data at the two bytes is 0xFF.

In step 1806-2, whether the number of used bytes of the Flash page reaches the size of the Flash page is determined, the Flash page is fully written if the number of used bytes of the Flash page reaches the size of the Flash page; otherwise, the Flash page is not fully written For example, in the present embodiment, the size of the Flash page is 4 KB, i.e. 4096 bytes. When the number of the used bytes of the Flash page reaches 4096 bytes, it indicates that the log area is fully written; when the number of the used bytes of the Flash page does not reach 4096 bytes, it indicates that the Flash page is not fully written.

Further, in the present embodiment, step 1806 may be omitted and step 1807 can be executed directly.

In step 1807, a size of a free area of the Flash page is computed.

In the present embodiment, computing the size of the free area of the Flash page includes: traversing the Flash page, recording a length of each update log of the Flash page; when no less than a second preset number of consecutive bytes of data, a value of which is a preset value, is found, computing a sum of lengths of update logs, obtaining the number of used bytes of the Flash page, obtaining the size of the free area of the Flash page by the size of the Flash page minus the used bytes of the Flash page.

In the present embodiment, the second preset number of bytes is two bytes, the preset value of the data at the two bytes is 0xFF.

For example, in the present embodiment, if the number of the used bytes of the Flash page is 32 bytes, the size of the Flash page is 4096 bytes, then the size of the free area of the Flash page=4096 bytes-32 bytes=4064 bytes.

In step 1808, whether the size of the free area of the Flash page is bigger than a length of the generated update log, step 1809 is executed if the size of the free area of the Flash page is bigger than the length of the generated update log; otherwise, step 1810 is executed.

In step 1809, the generated update log is written in the free area of the Flash page; the method is ended.

Figure 21:
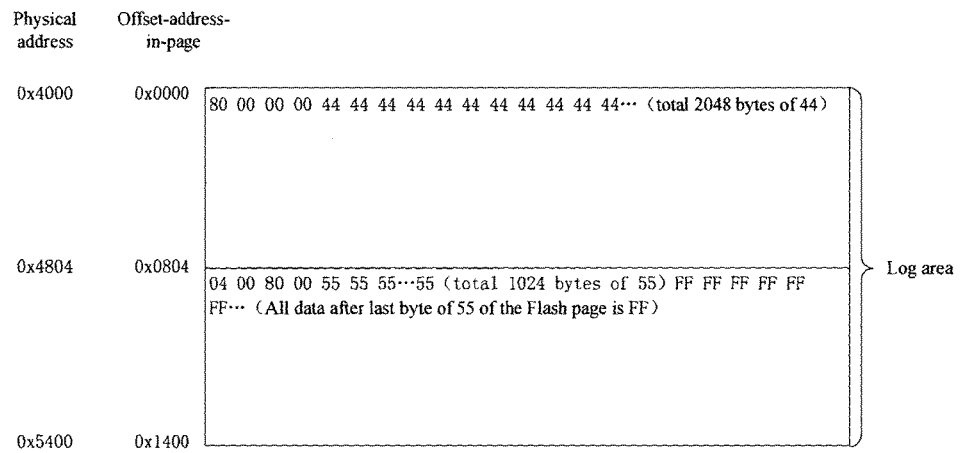
FIG. 21 is a diagram of the Flash page which is free page in an embodiment of the present invention.
Figure 22:
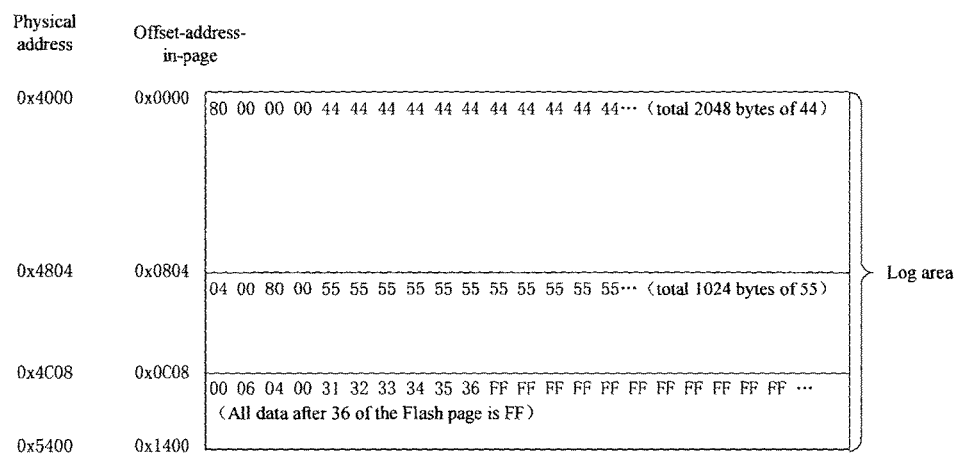
FIG. 22 is a diagram of a Flash page that an update log has been written in the Flash page as shown in FIG. 21.

For example, in the present embodiment, the Flash page, as shown in FIG. 21, includes two pieces of update logs, which are respectively 0x 80 00 00 00 44 44 44 44 44 44 . . . (2048 bytes of 0x44 in total), and 0x 04 00 80 00 55 55 55 55 55 55 . . . (2048 bytes of 0x55 in total), the generated update log is 0x 00 06 04 00 31 32 33 34 35 36, then the generated update log is written in the free area of the Flash page; the Flash page is shown in FIG. 22.

In step 1810, a new free page is searched for.

In the present embodiment, writing is failed if a new free page can not be found; the method is ended.

In step 1811, true data of the Flash page is obtained by organizing the update log and the generated update log on the Flash page.

Figures 23, 24:
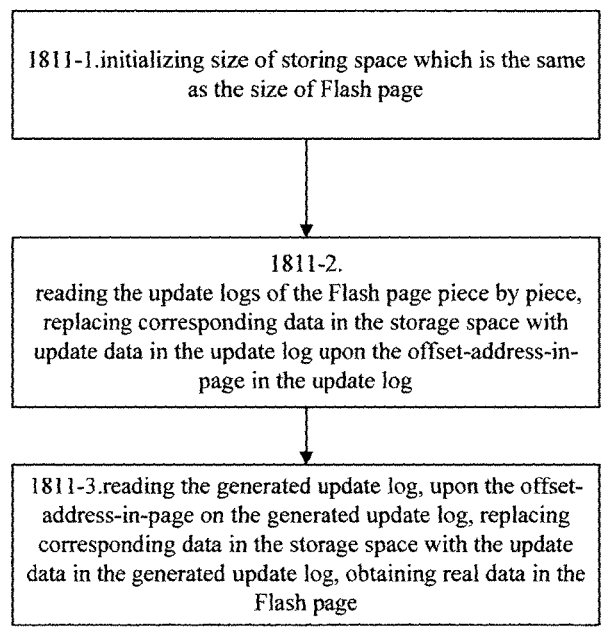
FIG. 23 is another diagram of the Flash page which is a free page in an embodiment of the present invention.
FIG. 24 is detailed flow diagram of step 1811 of an embodiment of the present invention.

For example, in the present embodiment, the Flash page shown as FIG. 23 includes three pieces of update logs: 0x 80 00 00 44 44 44 44 44 44 . . . (2048 bytes of 0x44 in total), 0x 00 80 00 55 55 55 55 55 . . . (1024 bytes of 0x55 in total) and 0x 03 EE 0C 00 66 66 66 66 66 66 . . . (1006 bytes of 0x66 in total); the generated update log is 0x 00 06 04 00 31 32 33 34 35 36, then the true data of the Flash page obtained by organizing is 0x 44 44 44 . . . (1024 bytes of 0x44 in total), 31 32 33 34 35 36 44 44 44 . . . (1018 bytes of 0x44 in total), 55 55 55 . . . (1024 bytes of 0x55 in total), and 66 66 66 . . . (1006 bytes of 0x66 in total).

As shown in FIG. 24, in the present embodiment, step 1811 includes steps 1811-1 to 1800-3.

In step 1811-1, a storing space the size of which is the same as the size of the Flash page is initialized.

In the present embodiment, a value of data in the initialized storing space is a preset value.

In the present embodiment, the preset value is 0xFF.

For example, in the present embodiment, the size of the Flash page is 4 KB, thus a storing space with the size of 4 KB is initialized.

In step 1811-2, the update logs of the Flash page is read piece by piece, corresponding data in the storage space is replaced with update data in the update logs based on offset-address-in-page in the update logs.

Figure 25:
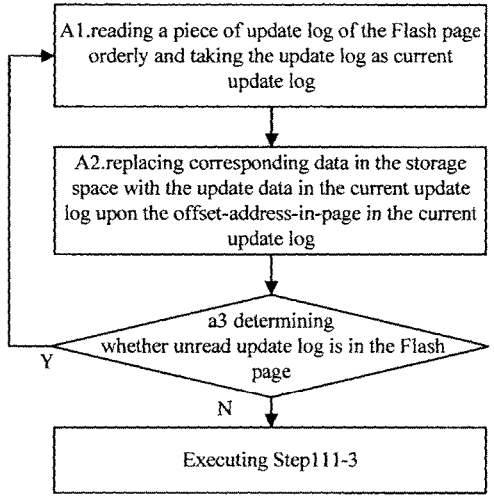
FIG. 25 is detailed flow diagram of step 1811-2 of an embodiment of the present invention.

As shown in FIG. 25, in the present embodiment, step 1811-2 includes steps a1 and a2.

In step a1, a piece of update log of the Flash page is read orderly and taken as current update log.

In step a2, corresponding data in the storing space is replaced with the update data in the current update log based on an offset-address-in-page in the current update log.

For example, in the present embodiment, if the current update log is 0x 80 00 00 00 44 44 44 . . . (2048 bytes of 0x44 in total), the offset-address-in-page of the current update log is 0x0000; the update data is 0x 44 44 44 . . . (2048 bytes of 0x44 in total); based on the offset-address-in-page in the current update log, the data from the 1st byte to the 2048th byte in the memory space is replaced with 0x 44 44 44 . . . (2048 bytes of 0x44 in total).

In step a3, whether there is an unread update log in the Flash page, step a1 is executed if there is an unread update log; otherwise, step 1811-3 is executed.

In the present embodiment, determining whether there is an unread update log in the Flash page includes: determining whether there are at least a second preset number of bytes with a preset value, there is not an unread update log in the Flash page if there are at least the second preset number of bytes with the preset value; otherwise, there is an unread update log in the Flash page.

In the present embodiment, the second preset number of bytes is two bytes, the preset value of the data of the two bytes is 0xFF.

In step 1811-3, a piece of generated update log is read, based on the offset-address-in-page of the generated update log, corresponding data in the storing space is replaced with update data in the generated update log, true data in the Flash page is obtained.

For example, in the present embodiment, the generated update log is 0x 00 06 04 00 31 32 33 34 35 36, the offset-address-in-page in the generated update log is 0x0400; the updated data is 0x 31 32 33 34 35 36; based on the offset-address-in-page, i.e. 0x0400, in the generated update log, the data from the 1025th byte to the 1030th byte in the storing space is replaced to be 0x 31 32 33 34 35 36.

In step 1812, a piece of update log is generated based on the true data of the Flash page and writing the update log is written in the new free page, the corresponding relation between the logical page number and the physical page number is updated, the method is ended.

In the present embodiment, generating a piece of update log based on the true data of the Flash page specifically includes: taking the true data of the Flash page as the update data, generating the update log based on a format of "a length of the update data+an offset-address-in-page+the update data".

In the present embodiment, two bytes of data indicates the length of the update data, two bytes of data indicates the offset-address-in-page.

Figure 26:
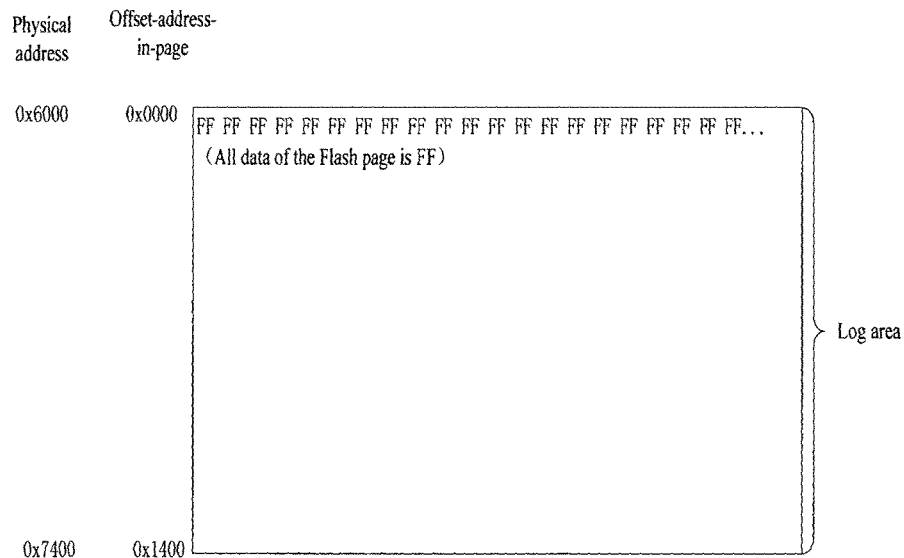
FIG. 26 is a diagram of a new free page of an embodiment of the present invention.
Figure 27:
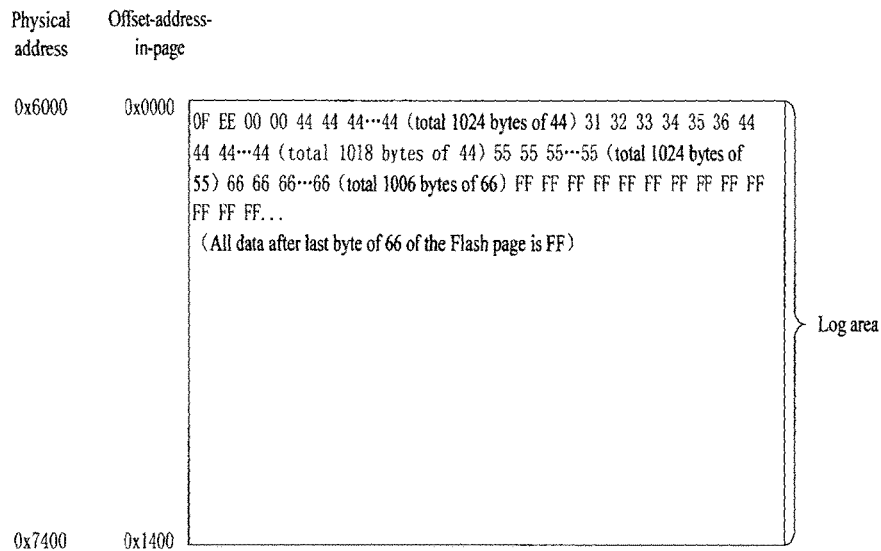
FIG. 27 is a diagram of a new free page that an update log has been written in the free page shown by FIG. 26.

For example, in the present embodiment, the true data of the Flash page is 0x 44 44 44 . . . (1024 bytes of 0x44 in total) 31 32 33 34 35 36 44 44 44 . . . (1018 bytes of 0x44 in total) 55 55 55 . . . (1024 bytes of 0x55 in total) 66 66 66 . . . (1006 bytes of 0x66 in total), then the generated update log is 0x 0F EE 00 00 44 44 44 . . . (1024 bytes of 0x44 in total) 31 32 33 34 35 36 44 44 44 . . . (1018 bytes of 0x44 in total) 55 55 55 . . . (1024 bytes of 0x55 in total) 66 66 66 . . . (1066 bytes of 0x66 in total); the new free page in the present embodiment is shown in FIG. 26; after the update log generated based on the read data of the Flash page is written in the new free page, the new free page is shown in FIG. 27.

In the present embodiment, a check bit can be set at the end of the update log.

In the present embodiment, updating the corresponding relation between the logical page number and the physical page number includes: in a mapping table of the logical page number and the physical page number, the physical page number corresponding to the logical page is changed from the page number of the Flash page to the page number of the new free page.

In the present embodiment, after step 1812, processing the Flash page is not limited by the present patent. In this case, processing the Flash page includes, but not limited to, clearing the data of the Flash page and making the Flash page into a free page. Further, processing the Flash page includes setting power down protecting mechanism, i.e. before step 1812, updating the Flash page to be a backup page, then executing step 1812; after step 1812 is executed, clearing the data of the Flash page to make the Flash page into a free page.

Figure 28:
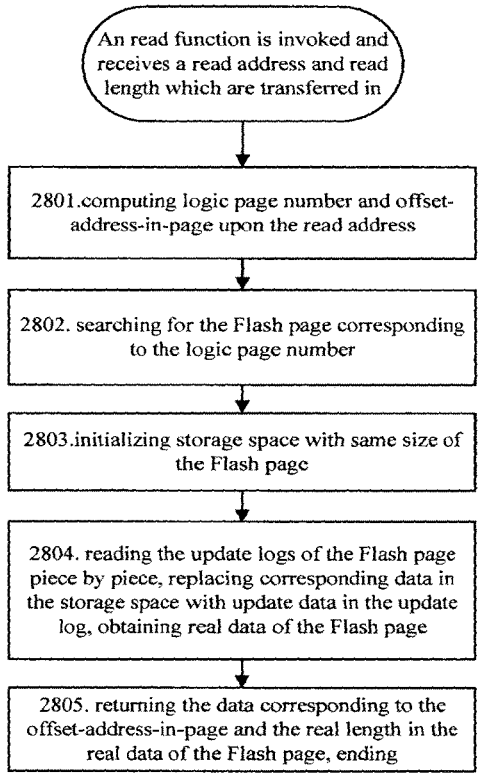
FIG. 28 is a flow diagram of a method for reading Flash data provided by an embodiment of the present invention.

Referring to FIG. 28, an embodiment provides a method for reading Flash data based on big page. In the present embodiment, a big page Flash uses method shown in FIG. 18 to update data; the method includes invoking a read function, transferring a read address (the read address is a logic address) and a read length into the read function; after the read function receives the read address and the read length which are transferred in, steps 2801 to 2805 are executed.

In step 2801, a logical page number and an offset-address-in-page are computed based on a read address.

For example, in the present embodiment, a sizes of the physical page and a sizes of the logical page are both 4 KB. The read address is 0x1400; the logical page number=|0x1400/0x1000|=1; the offset-address-in-page=0x1400−1*0x1000=0x0400.

In step 2802, a Flash page corresponding to the logical page number is searched for.

In the present embodiment, Step 2802 includes: based on the corresponding relation between a logical page number and a physical page number, searching for the Flash page corresponding to the logical page number in the Flash.

In the present embodiment, step 2802 includes: searching a mapping table of the logical page number and the physical page number, obtaining the physical page number corresponding to the logical page number, searching for the physical page corresponding to the physical page number in the Flash, obtaining the Flash page corresponding to the logical page number.

In step 2803, a memory space with same size of the Flash page is initialized.

In the present embodiment, all data in the initialized memory space is 0xFF.

For example, in the present embodiment, the size of the Flash page is 4 KB; the memory space with the space of 4 KB is initialized.

In step 2804, update logs of the Flash page are read piece by piece, corresponding data in the memory space is replaced with update data in the update log, true data of the Flash page is obtained.

For example, in the present embodiment, the Flash page includes three pieces of update logs: 0x 80 00 00 44 44 44

44 44 44 . . . (2048 bytes of 0x44 in total), 0x 00 80 00 55 55 55 55 55 . . . (1024 bytes of 0x55 in total) and 0x 03 EE 0C 00 66 66 66 66 66 66 . . . (1006 bytes of 0x66 in total), the generated update log is 0x 00 06 04 00 31 32 33 34 35 36; the true data of the Flash page obtained by organizing is: 0x 44 44 44 . . . (1024 bytes of 0x44 in total), 31 32 33 34 35 36 44 44 44 . . . (1018 bytes of 0x44 in total), 55 55 55 . . . (1024 bytes of 0x55 in total) and 66 66 66 . . . . (1006 bytes of 0x66 in total).

Figure 29:
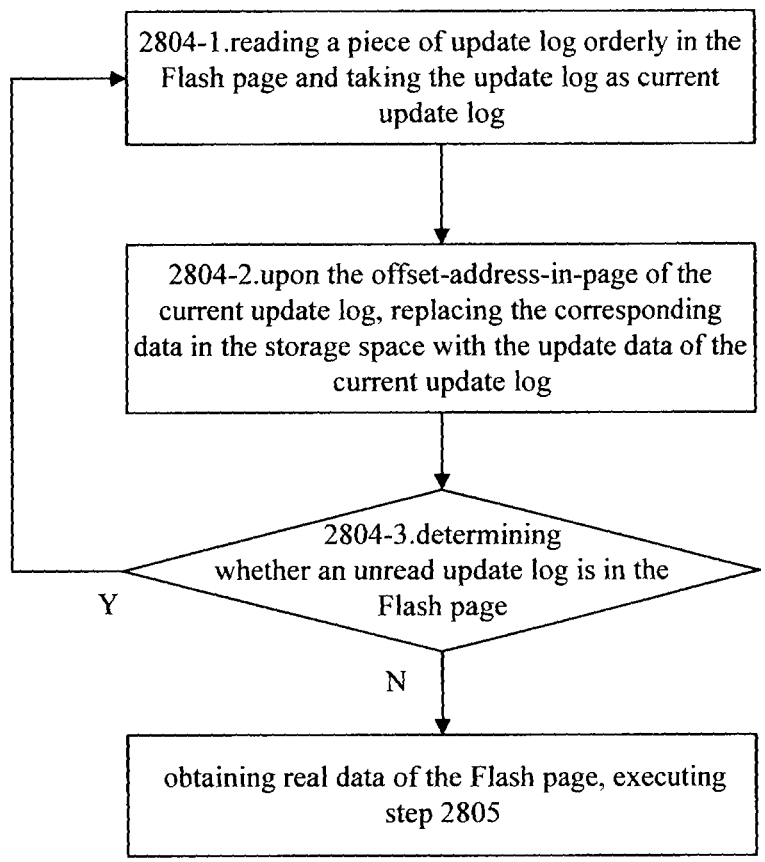
FIG. 29 is a detailed flow diagram of step 2804 in an embodiment of the present invention.

As shown in FIG. 29, in the present embodiment, step 2804 includes steps 2804-1 to 2804-3.

In step 2801-1, a piece of update log in the Flash page is read orderly and taken as a current update log.

In step 2804-2, based on the offset-address-in-page of the current update log, the corresponding data in the memory space is replaced with the update data of the current update log.

For example, in the present embodiment, if the current update log is 0x 80 00 00 00 44 44 44 . . . (2048 bytes of 0x44 in total), the offset-address-in-page of the current update log is 0x0000, the update data is 0x 44 44 44 . . . (2048 bytes of 0x44 in total), based on the offset-address-in-page in the current update log, the data from the 1st byte to the 2048th byte in the memory space is replaced to be 0x 44 44 44 . . . (2048 bytes of 0x44 in total).

In step 2803-3, whether there is an unread update log in the Flash page, step 2804-1 is executed if there is an unread update log in the Flash page; otherwise, true data of the Flash page is obtained, step 2805 is executed.

In the present embodiment, determining whether there is an unread update log in the Flash page includes: after the current update log, whether there are at least a second preset number of bytes with a preset value is determined, no unread update log is in the Flash page if after the current update log, there are at least a second preset number of bytes with the preset value; otherwise, there is an unread update log in the Flash page.

In the present embodiment, the second preset number of bytes is two bytes and the preset value is 0xFF.

In step 2805, data corresponding to the offset-address-in-page and the read length in the true data of the Flash page is returned, the method is ended.

For example, the true data of the Flash page is 0x 44 44 44 . . . (1024 bytes of 0x44 in total), 31 32 33 34 35 36 44 44 44 . . . (1018 bytes of 0x44 in total), 55 55 55 . . . (1024 bytes of 0x55 in total) and 66 66 66 . . . (1024 bytes of 0x66 in total); the offset-address-in-page is 0x0400, the read length is 8 bytes, the data from the 1025th byte to the 1032nd byte of the Flash page, (i.e. 0x 31 32 33 34 35 36 44 44) is returned.

A method for writing Flash data, includes:

S10 of obtaining a logical page number of data to be written this time and an offset-address-in-page of the data to be written this time according to a writing address; searching for a physical page corresponding to the logical page number of the data to be written this time based on a corresponding relation between a logical page number and a physical page number;

S20 of determining whether a remaining space of both an data area and an index area of the physical page are sufficient, orderly storing the data to be written this time in the data area of the physical page if the remaining space of both the data area and the index area of the physical page are sufficient, generating a piece of index log based on an offset-address-in-page of the data written this time, a length of the data written this time and a storing address of the data written this time, writing the generated piece of index log orderly in the index area of the physical page, ending; otherwise, executing S30;

S30 of searching for a free page, executing S40;

S40 of reading data stored in the data area of the physical page, organizing the read data based on a piece of index log in the index area of the physical page and the data to be written this time, obtaining valid data in the data area of the physical page, orderly writing the valid data in a data area of the free page, generating an piece of index log based on the valid data, orderly writing the generated piece of index log in an index area of the free page, executing S50;

S50 of updating the corresponding relation between the logical page number and the physical page number.

Searching for the physical page corresponding to the logical page number of the data to be written this time based on the corresponding relation between the logical page number and the physical page number includes: searching a mapping table of the logical page number and the physical page number, obtaining a physical page number corresponding to the logical page number of the data to be read this time, searching for the physical page with the physical page number in the Flash.

Updating the corresponding relation between the logical page number and the physical page number includes: updating the physical page number, in the mapping table of the logical page number and the physical page number, corresponding to the logical page number of the data to be written this time, to be the physical page number of the free page.

Determining whether a remaining space of the data area of the physical page is sufficient includes:

step A1 of computing a storing address of the data to be written this time based on a last piece of index log in the index area of the physical page;

step A2 of computing a result of the storing address of the data to be written this time plus a length of the data to be written this time; determining whether the result is more than a maximum offset address in the data area of the physical page; the remaining space of the physical page is not sufficient in a case that the result is more than the maximum offset address in the data area of the physical page; otherwise, the remaining space of the data area of the physical page is sufficient.

Step A1 includes: searching for a last piece of index log in the index area of the physical page; obtaining a storing address of written data in the last piece of index log and a length of the written data in the last piece of index log; computing a sum of the storing address of written data and the length of the written data and obtaining a storing address of the data to be written this time.

Determining whether a remaining space of the index area of the physical page is sufficient includes:

step B1 of computing the remaining space of the index area of the physical page;

step B2 of determining whether the remaining space of the index area of the physical page is bigger than a length of a piece of index log, the remaining space of the index area of the physical page is sufficient if the remaining space of the index area of the physical page is bigger than the length of the piece of index log; otherwise, the remaining space of the index area of the physical page is not sufficient.

Step B1 includes: searching for a last piece of index log in the index area of the physical page, obtaining a number of used bytes in the index area of the physical page based on an offset address of the end of the last piece of index log in the physical page, computing a result of a size of the index area of the physical page minus the byte number of the used bytes in the index area of the physical page, obtaining the remaining space of the index area of the physical page.

Searching for the last piece of index log in the index area of the physical page includes: traversing the index area of the physical page, when there is no less than a preset number of consecutive bytes of data, a value of which is a preset value, is found, the piece of index log before those bytes of data is the last piece of index log in the index area of the physical page.

Searching for the last piece of index log in the index area of the physical page includes:

step a1 of locating a first byte and a last byte in an valid memory space in the index area of the physical page, taking the first byte as a current start byte and taking the last byte as a current end byte, executing step a2;

step a2 of locating a middle byte between the current start byte and the current end byte and taking the middle byte as a current middle byte, executing step a3;

step a3 of starting from a byte after the current middle byte, reading data of which a length equals a length of the a piece of index log, determining whether the read data is a piece of index log, taking the current middle byte as the current start byte, going back to step a2 if the read data is a piece of index log; otherwise, executing step a4;

step a4 of starting from the current middle byte, forward reading data of which a length equals a length of a piece of index log, determining whether the read data is a piece of index log, the read data is taken as the last piece of index log in the index area of the physical page if the read data is a piece of index log; otherwise, taking the current middle byte as the current end byte, executing step a2.

Searching for the last piece of the index log in the index area of the physical page includes:

step b1 of locating a last byte of the valid memory space in the index area of the physical page, taking the last byte as a current byte, executing step b2;

step b2 of starting from the current byte, forward reading data of which a length equals a length of a piece of index log, determining whether the read data is a piece of index log, the read data is the last piece of index log in the index area of the physical page if the read data is a piece of index log; otherwise, executing step b3;

step b3 of taking a byte before the read data as a current byte, executing step b2.

Determining whether the read data is a piece of index log includes: determining whether a value of each byte of the read data is a preset value, the read data is not a piece of index log if the value of each byte of the read data is a preset value; otherwise, the read data is a piece of index log.

S40 includes:

step C1 of initializing a memory space of which a size is the same as a size of a data area of the physical page;

step C2 of orderly reading the pieces of index logs in the index area of the physical page, reading corresponding data from the data area of the physical page based on a storing address of written data and a length of the written data in the piece of index log, writing the read data into a corresponding position of the memory based on an offset-address-in-page of the written data in the piece of index log;

step C3 of writing the data to be written this time in the corresponding position of the memory based on the offset-address-in-page of the data to be written this time;

step C4 of traversing the memory space, when a piece of non-free area in the memory space is found in the memory space, reading data in the non-free area, writing the read data in the data area of the free page and writing the read data in the data area of the free page, and generating a piece of index log based on the read data and writing the piece of index log in the index area of the free page.

A method for reading Flash data includes:

T10 of computing a logical page number of data to be read this time and an offset-address-in-page of the data to be read this time based on a reading address, searching for a physical page corresponding to a logical page number of the data to be read this time based on a corresponding relation between the logical page number and the physical page number;

T20 of setting and resetting a read flag corresponding to the data to be read this time based on the length of the data to be read this time;

T30 of searching for and reading a last piece of index log in the index area of the physical page and taking the last piece of index log as a current piece of index log;

T40 of determining whether the current piece of index log relates to the data, of which a read flag is not set, in the data to be read this time based on the offset-address-in-page of the written data and the length of the written data in the current index flag, executing step T60 if the current piece of index log relates to the data, of which a read flag is not set, in the data to be read this time; otherwise, executing step T50;

T50 of reading a previous piece of index log of the current piece of index log and taking the previous piece of index log as a current piece of index log, executing step T40;

T60 of reading the related data from the physical page based on a storing address of the written data in the current piece of index log and setting the read flag corresponding to the read data;

T70 of checking the read flag corresponding to the data to be read this time, determining whether all of the data to be read this time is read, ending the reading of Flash data; otherwise, executing step T50.

Searching for the physical page corresponding to the logical page number of the data to be read this time based on the corresponding relation between the logical page number and the physical page number includes: searching a mapping table of the logical page number and the physical page number, obtaining a physical page number corresponding to the logical page number of the data to be read this time, searching for the physical page with the physical page number in the Flash.

T20 includes: setting and resetting read flags, of which a number equals to the length of the data to be read this time, each read flag corresponds to each byte data in the data to be read this time.

Searching for the last piece of index log in the index area of the physical page includes: traversing the index area of the physical page, when there is no less than a second preset number of consecutive bytes of data, a value of which is a preset value, found, determining that the piece of index log before those bytes of data is the last piece of index log in the index area of the physical page.

Searching for the last piece of index log in the index area of the physical page specifically includes:

a1 of locating a first byte and a last byte in an valid memory space in the index area of the physical page, taking the first byte as a current start byte and taking the last byte as a current end byte, executing step a2;

a2 of locating a middle byte between the current start byte and the current end byte and taking the middle byte as a current middle byte, executing step a3;

a3 of starting from a byte after the current middle byte, reading data of which a length equals a length of the a piece of index log, determining whether the read data is a piece of index log, taking the current middle byte as a current start byte if the read data is a piece of index log, executing step a2; otherwise, executing step a4;

a4 of starting from the current middle byte, forward reading data of which a length equals a length of a piece of index log, determining whether the read data is a piece of index log, the read data is the last piece of index log in the index area of the physical page if the read data is a piece of index log; otherwise, taking the current middle byte as a current end byte, executing step a2.

Searching for the last piece of index log in the index area of the physical page specifically includes:

b1 of locating a last byte of the valid memory space in the index area of the physical page, taking the last byte as a current byte, executing step b2;

b2 of starting from the current byte, forward reading data of which a length equals a length of a piece of index log, determining whether the read data is a piece of index log, the read data is the last piece of index log in the index area of the physical page if the read data is a piece of index log; otherwise, executing step b3;

b3 of taking a byte before the read data as a current byte, executing step b2.

Determining whether the read data is a piece of index log includes: determining whether a value of each byte of the read data is a preset value, the read data is not an piece of index log if the value of each byte of the read data is the preset value; otherwise, the read data is an piece of index log.

Step T40 includes: computing, based on an offset-address-in-page of the written data and a length of the written data in the current piece of index log to obtain a range of the offset-address-in-page related by the current piece of index log; determining whether the offset-address-in-page of the data, of which the read flag is not set, in the data to be read this time is in the range of the obtained offset-address-in-page, the current piece of index log relates to the data, of which the read flag is not set, to in the data to be read this time if the offset-address-in-page of the data, of which the read flag is not set, in the data to be read this time is in the range of the obtained offset-address-in-page, executing step T60; otherwise, the current piece of index log does not relate to the data, of which the read flag is not set, in the data to be read this time, executing step T50.

T70 includes: determining whether the read flag corresponding to the data to be read this time is set, all the data to be read this time being read, ending; otherwise, not all the data to be read this time being read, executing step T50.

A method for reading Flash data, includes:

U10 of computing a logical page number of data to be read this time and an offset-address-in-page of the data to be read this time based on a reading address; searching for a physical page corresponding to a logical page of the data to be read this time based on a corresponding relation between a logical page number and a physical page number;

U20 of initializing a memory space of which a size is the same as a size of the data area of the physical page;

U30 of orderly reading a piece of index log in the index area of the physical page; reading corresponding data from the data area of the physical page based on a storing address of written data and a length of the written data in the read piece of index log; writing the read data into a corresponding position of the memory space based on an offset-address-in-page of the written data in the read piece of index log;

U40 of reading the data to be read this time from the memory space based on the offset-address-in-page of the data to be read this time and the length of the data to be read this time; ending.

Searching for the physical page corresponding to the logical page number of the data to be read this time based on the corresponding relation between the logical page number and the physical page number includes: searching a mapping table of the logical page number and the physical page number; obtaining a physical page number corresponding to the logical page number of the data to be read this time; searching for the physical page with the physical page number in the Flash.

The U30 includes:

c1 of orderly reading a piece of index log in the index area of the physical page and taking the piece of index log as a current piece of index log;

c2 of reading corresponding data from the data area of the physical page based on the storing address of the written data in the current piece of index log; writing the read data in a corresponding position of the memory space based on the offset-address-in-page of the written data in the piece of index log;

c3 of determining whether there is an unread piece of index log in the index area of the physical page; executing c1 if there is an unread piece of index log; otherwise, executing U40.

A method for reading Flash data, includes:

V10 of computing a logical page number of data to be read this time and an offset-address-in-page of the data to be read this time based on a reading address; searching for a physical page corresponding to the logical page number of data to be read this time based on a corresponding relation between a logical page number and a physical page number;

V20 of initializing a current offset-address-in-page based on an offset-address-in-page of the data to be read this time;

V30 of searching and reading a last piece of index log in an index area of the physical page and taking the last piece of index log as a current piece of index log; executing step V40;

V40 of determining whether the current piece of index log relates to a current offset-address-in-page based on the offset-address-in-page of the written data and the length of the written data in the current piece of index log, executing step V60 if the current piece of index log relates to a current offset-address-in-page; otherwise, executing step V50;

V50 of reading a previous piece of index log of the current piece of index log and taking the previous piece of index log as a current piece of index log, executing step V40;

V60 of reading data starting from the current offset-address-in-page of the data to be read which relates to the current piece of index log from the data area of the physical page based on the storing address of the written data in the current piece of index log; updating the current offset-address-in-page based on the read data, executing step V70;

V70 of determining whether all of the data to be read this time is read, ending reading of the Flash data if all of the data to be read this time is read; otherwise, executing step V30.

Searching for the physical page corresponding to the logical page number of the data to be read this time based on the corresponding relation between the logical page number and the physical page number specifically includes: searching a mapping table of the logical page number and the physical page number; obtaining a physical page number corresponding to the logical page number of the data to be read this time; searching for the physical page with the physical page number in the Flash.

Initializing the current offset-address-in-page based on the offset-address-in-page of the data to be read this time includes: initializing the current offset-address-in-page to be the offset-address-in-page of the data to be read this time.

Updating the current offset-address-in-page based on the data to be read includes: updating the current offset-address-in-page to be a next offset-address-in-page of an offset-address-in-page corresponding to a last byte of data in the read data.

Determining whether all of the data to be this time is read includes: computing a result of the offset-address-in-page of the data to be read this time plus the length of the data to be read this time; determining whether the result is less than the current offset-address-in-page; all of the data to be read is read if the result is less than the current offset-address-in-page; otherwise, not all of the data to be read is read.

Step V20 further includes: initializing a current count.

In Step V60, after reading data starting from the current offset-address-in-page of the data to be read, which relates to the current piece of index log, from the data area of the physical page based on the storing address of the written data in the current piece of index log, the method further includes: updating the current count based on the read data.

Step V70 includes: determining whether a value of the current count equals a preset value, all of the data to be read this time is read if the value of the current count equals the preset value; otherwise, not all of the data to be read this time is read.

Initializing a current count includes: initializing the current count to be the length of the data to be read this time.

Initializing a current count based on the read data includes: updating the current count to be a result of the current value of the current count minus the length of the read data.

Determining whether a value of the current count equals a preset value includes whether the current count equals 0.

Initializing a current count includes: initializing the current count to be 0.

Updating the current count based on the read data includes: updating the current count to be a result of adding the length of the read data to the current value of the current count.

Determining whether a value of the current count equals a preset value includes determining whether the value of the current count equals the length of the data to be read this time.

Searching for the last piece of index log in the index area of the physical page includes: traversing the index area of the physical page; when no less than a second preset number of consecutive bytes of data, a value of which is a preset value, is found, the piece of index log before those bytes of data is the last piece of index log in the index area of the physical page.

Searching for the last piece of index log in the index area of the physical page includes:

a1 of locating a first byte and a last byte in an valid memory space in the index area of the physical page; taking the first byte as a current start byte and taking the last byte as a current end byte, executing step a2;

a2 of locating a middle byte between the current start byte and the current end byte and taking the middle byte as a current middle byte, executing step a3;

a3 of from a byte after the current middle byte, reading data of which a length equals a length of a piece of index log; determining whether the read data is a piece of index log, taking the current middle byte as a current start byte if the read data is a piece of index log executing step a2; otherwise, executing step a4;

a4 of from the current middle byte, forward reading data of which a length equals a length of a piece of index log; determining whether the read data is a piece of index log, the read data is the last piece of index log in the index area of the physical page if the read data is a piece of index log; otherwise, taking the current middle byte as a current end byte, executing step a2.

Searching for the last piece of index log in the index area of the physical page includes:

b1 of locating a last byte of a valid memory space in the index area of the physical page, taking the last byte as a current byte, executing step b2;

b2 of from the current byte, forward reading data of which a length equals a length of a piece of index log; determining whether the read data is a piece of index log, the read data is the last piece of index log in the index area of the physical page if the read data is a piece of index log; otherwise, executing step b3;

b3 of taking a byte before the read data as a current byte, executing step b2.

Determining whether the read data is a piece of index log includes: determining whether a value at each byte of the read data is a preset value, the read data is not an piece of index log if the value at each byte of the read data is the preset value; otherwise, the read data is an piece of index log.

Determining whether the current piece of index log relates to the current offset-address-in-page based on the offset-address-in-page of the written data and the length of the written data in the current piece of index log includes: computing based on the offset-address-in-page of the written data and the length of written data in the current piece of index log to obtain a range of the offset-address-in-page related to the current piece of index log; determining whether the current offset-address-in-page is in the range of offset-address-in-page obtained by computing; the current piece of index log relates to the current offset-address-in-page if the current offset-address-in-page is in the range of offset-address-in-page obtained by computing; otherwise, the current piece of index log does not relate to the current offset-address-in-page.

A method for updating data of a Flash based on a big page, includes:

step A1 of computing a logical page number and a first offset-address-in-page based on an update address; generating an update log based on an update data, a length of the update data and the first offset-address-in-page; searching for a Flash page corresponding to the logical page number in the Flash based on a corresponding relation between a logical page number and a physical page number;

step A2 of determining whether the Flash page is free, writing the generated update log in the Flash page if the Flash page is free, ending; otherwise, executing step A3;

stepA3 of computing a size of a free area of the Flash page, determining whether the size of the free area of the Flash page is more than a length of the generated update log; writing the generated update log in the free area of the Flash page if the size of the free area of the Flash page is more than the length of the generated update log, ending; otherwise, executing step A4;

step A4 of searching for a new free page in the Flash; obtaining true data in the Flash page by organizing based on the update log and the generated update log in the Flash page; obtaining a piece of update log based on the true data and writing the piece of update log in the new free page; updating the corresponding relation between the logical page number and the physical page number, ending.

Determining whether the Flash page is a free page includes: reading data at a preset number of bytes starting from an initial address; determining whether a value of the read date at each byte is a preset value, the Flash page is a free page if the value of the read date at each byte is the preset value; otherwise, the Flash page is not a free page.

The method between step A2 and step A3 further includes: determining whether the Flash page is fully written, executing step A4 if the Flash page is fully written; otherwise, executing step A3.

Determining whether the Flash page is fully written includes: computing a number of used bytes of the Flash; determining whether the number of used bytes of the Flash reaches a size of the Flash page, the Flash page is fully written if the number of used bytes of the Flash reaches the size of the Flash page; otherwise, the Flash page is not fully written.

Computing the number of used bytes of the Flash includes: traversing the Flash page, recording a length of each update log of the Flash page; when no less than a second preset number of consecutive bytes of data, a value of which is a preset value, is found, computing a length sum of update logs and obtaining the number of used bytes of the Flash page.

Computing the size of the free area of the Flash page includes: traversing the Flash page, recording a length of each update log of the Flash page, computing a sum of lengths of update logs when no less than a second preset number of consecutive bytes of data, a value of which is a preset value, is found, obtaining the number of used bytes of the Flash page; obtaining the size of the free area of the Flash page by deducting the number of the used bytes of the Flash page from the size of the Flash page.

Obtaining the true data of the Flash page based on the update log and the generated update log in the Flash page includes:

step B1 of initializing a memory space of which a size equals a size of the Flash page;

step B2 of reading update logs of the Flash page piece by piece, replacing corresponding data in the memory space with update data in the read update logs based on the a first offset-address-in-page of the update logs;

step B3 of reading a generated update log, replacing corresponding data of the memory space with update data in the generated update log based on a first offset-address-in-page of the generated update log; obtaining true data of the Flash page.

Step B2 includes:

step C1 of orderly reading a piece of update log of the Flash page and taking the piece of update log of the Flash page as a current update log;

step C2 of based on a first offset-address-in-page of the current update log, replacing corresponding data of the memory space with update data of the current update log;

step C3 of determining whether there is an unread update log in the Flash page, executing step C1 if there is an unread update log in the Flash page; otherwise, executing step B3.

Determining whether there is an unread update log in the Flash page includes: determining whether there are no less than a second preset number of bytes with a preset value after the current update log, no unread update log is in the Flash page if there are no less than a second preset number of bytes data with the preset value after the current update log; otherwise, there is an unread update log in the Flash page.

Obtaining a piece of update log based on the true data includes: obtaining a piece of update log based on a length of the true data, the true data and an initial address of data in a new free page.

Searching for a Flash page corresponding to the logical page number in the Flash based on the corresponding relation between the logical page number and the physical page number includes: searching a mapping table of the logical page number and the physical page number, obtaining a physical page number corresponding to the logical page number, searching for a physical page corresponding to the physical page number and obtaining the Flash page corresponding to the logical page number.

Updating the corresponding relation between the logical page number and the physical page number includes: modifying the physical page number of the Flash page corresponding to the logical page number to be a page number of the new free page in the mapping table of the logical page number and the physical page number.

A method for reading data of a Flash based on a big page, includes:

step D1 of computing a logical page number and a second offset-address-in-page based on a read address; searching for a Flash page corresponding to the logical page number in the Flash based on a corresponding relation between a logical page number and a physical page number;

step D2 of initializing a memory space of which a size is the same as a size of the Flash page; orderly reading update logs of the Flash page piece by piece; replacing corresponding data in the memory space with update data in the read update log based on a first offset-address-in-page in the read update logs; obtaining true data in the Flash page;

step D3 of returning data corresponding to a second offset-address-in-page and a read length in the true data of the Flash page.

Step D2 includes:

step E1 of orderly reading a piece of update log in the Flash page and taking the piece of update log as a current update log;

step E2 of replacing corresponding data in the memory space with update data in the current update log based on a first offset-address-in-page in the current update log;

step E3 of determining whether there is an unread update log in the Flash page, executing step E1 if there is an unread update log in the Flash page; otherwise executing step D3.

Determining whether there is an unread update log in the Flash page includes: determining whether there are no less than a second preset number of bytes with a preset value after the current update log, no unread update log is in the Flash page there are no less than a second preset number of bytes with the preset value after the current update log; otherwise, there is an unread update log in the Flash page.

Searching for a Flash page corresponding to the logical page number in the Flash based on the corresponding relation between the logical page number and the physical page number includes: searching a mapping table of the logical page number and the physical page number; obtaining a physical page number corresponding to the logical page number, searching for a physical page corresponding to the physical page number and obtaining the Flash page corresponding to the logical page number.

A method for updating data of a Flash based on a big page, includes: obtaining a physical page number and a first offset-address-in-page based on a writing address; writing data to be written in the Flash based on the big page; where each Flash page of the Flash based on the big page is divided into a valid data area and a log data area, writing the data to be written in the Flash based on the big page includes:

step S1 of determining whether a Flash page corresponding to the physical page number is a free page, writing the data to be written in the valid data area of the Flash page if the Flash page corresponding to the physical page number is a free page, ending; otherwise, executing step S2;

step S2 of based on a preset format, generating a log record according to the data to be written, a length of the data to be written and a first offset-address-in-page;

step S3 of computing a size of a remaining space of the log area of the Flash page, determining whether the remaining space of the log area of the Flash page is more than a length of the log record, writing the generated log record in the log area of the Flash page if the remaining space of the log area of the Flash page is more than a length of the log record, ending; otherwise, executing step S4;

step S4 of searching for a new free page in the Flash based on the big page, reorganizing data based on the log record in the log area of the Flash page, the generated log record and valid data of the valid data area; writing the data obtained by reorganizing to valid data area of the new free page, ending.

Determining whether the Flash page corresponding to the physical page number is a free page includes: searching the log area of the physical page, determining whether a non-free flag in the log area of the Flash page is set, the Flash page is not a free page if the non-free flag in the log area of the Flash page is set; otherwise, the Flash page is free page;

Correspondingly, after writing data obtained by reorganizing in the valid data area of the new free page, the method further includes: setting the non-free flag of the log area of the new free page.

Before determining whether the Flash page corresponding to the physical page number is a free page, the method further includes: setting the first two bytes of the log area of each Flash page as a non-free flag, where the non-free flag is set when the data of the first two bytes of each Flash page is preset data; otherwise, the non-free flag are reset.

Correspondingly, setting the non-free flag of the log area of the new free page includes: modifying the data of the first two bytes of log area of the new free page to be the preset data.

Determining whether the Flash page corresponding to the physical page number is a free page includes: reading a preset number of bytes of data starting from an start address of the Flash page; determining whether a value at each read byte is 0xFF, the Flash page is a free page if a value at each read byte is 0xFF; otherwise the Flash page is not a free page.

Determining whether the Flash page corresponding to the physical page number is a free page includes: reading data at a preset number of bytes starting from the first offset-address-in-page of the Flash page; determining whether a value at each read byte is 0xFF, the Flash page is a free page if the value at each read byte is 0xFF; otherwise, the Flash page is not a free page.

Between step S1 and step S2, the method further includes: determining whether the log area of the Flash page is fully written, executing step S4 if the log area of the Flash page is fully written; otherwise, executing step S2.

Determining whether the log area of the Flash page is fully written includes: computing a number of used bytes of the log area of the Flash page; determining whether the number of used bytes equals a size of the Flash page, the log area of the Flash page is fully written if the number of used bytes equals a size of the Flash page; otherwise, the log area of the Flash page is not fully written.

Computing the number of used bytes of the log area of the Flash page includes: traversing the log area of the Flash page; recording a length of each log record of the Flash page; when at least two consecutive bytes of 0xFF is found, computing a sum of lengths of log records and obtaining the number of used bytes of the log area.

Computing the size of the remaining space of the log area of the Flash includes: traversing the log area of the Flash page; recording a length of each log record of the log area of the Flash page; when two or more consecutive bytes of 0xFF are found, computing a sum of lengths of log records and obtaining a number of used bytes of the log area of the Flash page; deducting the number of used bytes from the size of the log area of the Flash page to obtain the size of the remaining space of the log area of the Flash page.

Reorganizing data based on the log record of the log area of the Flash page, the generated log record and the valid data of the valid data area includes:

step A of reading the valid data of the valid data area of the Flash page;

step B of reading the log records of the log area of the Flash page piece by piece and reading the generated log record, updating corresponding data of the valid data with data to be written in the log record.

Step B includes:

step B1 of orderly reading a piece of log record of the log area of the Flash page;

step B2 of based on a first offset-address-in-page in the read log record, updating corresponding data of valid data with data to be written of the read log record;

step B3 of determining whether there is an unread log record in the log area of the Flash page, executing step B1 if there is an unread log record in the log area of the Flash page; otherwise executing step B4;

step B4 of reading the generated log record, updating corresponding data of the valid data with the data to be written of the generated log record based on a first offset-address-in-page of the generated log record.

Determining whether there is an unread log record in the log area of the Flash page includes: determining whether there are at least two bytes of 0xFF after the read log record, no unread log record is in the log area of the Flash page if there are at least two bytes of 0xFF after the read log record; otherwise, there is an unread log record in the log area of the Flash page.

A method for reading data of Flash based on a big page includes: obtaining a physical page number and a second offset-address-in-page based on a read address; reading data of the Flash based on the big page; reading the data of the Flash based on the big page includes:

step T1 of reading valid data of a valid data area of the Flash page corresponding to the physical page number;

step T2 of reading log records of the log area of the Flash page piece by piece, updating corresponding data in the valid data with data to be written in the log records based on a first offset-address-in-page of the log records;

step T3 of returning data, which corresponds to the second offset-address-in-page and a read length, in the data obtained by updating.

Step T2 includes:

step a of orderly reading a piece of log record in the log area of the Flash page;

step b of based on a first offset-address-in-page of the read log record, updating corresponding data in the valid data with the data to be written in the read log record;

step c of determining whether there is an unread log record in the log area of the Flash page, executing step a if there is an unread log record in the log area of the Flash page; otherwise, executing step T3.

Determining whether there is an unread log record in the log area of the Flash page includes: determining whether there are at least two bytes of 0xFF after the read log record, no unread log record is in the log area of the Flash page if there are at least two bytes of 0xFF after the read log record; otherwise, there is an unread log record in the log area of the Flash page.

The described embodiments are only preferred embodiments of the invention and the embodiments are not intended to limit the invention. Any alteration or change easily obtained by those skilled in the art based on the invention should fall in the scope of protection of the invention.

The invention claimed is:

1. A method for writing and reading Flash data, wherein writing the Flash data comprises:
a first step of obtaining a logical page number of data to be written and an offset-address-in-page of the data to be written according to a writing address and searching for a physical page corresponding to the logical page number of the data to be written based on a corresponding relation between a logical page number and a physical page number;
a second step of determining whether a remaining space of the physical page is sufficient and, if so, completing writing data by writing a generated log in the remaining space, and ending the writing of the Flash data;
if the remaining space of the physical page is determined not to be sufficient, the writing comprises:
a third step of searching for a free page,
executing a fourth step of organizing page information of the physical page and information of the data to be written to obtain updated information and completing writing the Flash data in the free page based on the updated information, and
executing a fifth step of updating the corresponding relation between the logical page number and the physical page number;
wherein the reading the Flash data comprises:
a step of, when data in a physical page is required to be read, computing a logical page number of data to be read and an offset-address-in-page of the data to be read based on a reading address, and searching for a physical page corresponding to the logical page number of the data to be read based on the corresponding relation between the logical page number and the physical page number;
a step of reading a log in the physical page, reading corresponding data from the physical page based on a storing address of written data and a length of the written data in the read log, and updating corresponding data with the read data based on an offset-address-in-page of the written data in the read log; and
a step of reading the data to be read from the updated data based on the offset-address-in-page of the data to be read and a length of the data to be read, and ending the reading the Flash data; and
wherein the second step of determining whether the remaining space of the physical page is sufficient, and if so, completing writing the Flash data by writing the generated log in the remaining space further comprises:
determining whether both remaining spaces of a data area and an index area are sufficient, storing the data to be written in the data area of the physical page in order if both the remaining spaces of the data area and the index area are sufficient, and generating a piece of an index log based on the offset-address-in-page of the data to be written, a length of the data to be written and a storing address of the data to be written, and writing the generated piece of the index log to the index area of the physical page in order;
wherein page information of the physical page comprises the piece of the index log in the index area of the physical page, the information of the data to be written comprises the data to be written; and
wherein organizing page information of the physical page and information of the data to be written to obtain updated information and completing the writing data in the free page based on the updated information comprises:
reading data stored in the data area of the physical page, organizing the read data based on the piece of index log in the index area of the physical page and the data to be written to obtain valid data in the data area of the physical page, and
writing the valid data in a data area of the free page,
generating the piece of index log based on the valid data and writing the generated piece of index log in order in an index area of the free page;
wherein when the data in the physical page is required to be read, the method further comprises initializing a memory space of which a size is the same as a size of the data area of the physical page;
wherein the step of reading the log in the physical page, reading corresponding data from the physical page based on a storing address of the written data and a length of the written data in the read log, updating the corresponding data with the read data based on an offset-address-in-page of the written data in the read log comprises:
a step of reading, in order, a piece of index log in the index area of the physical page, reading the corresponding data from the data area of the physical page based on the storing address of the written data and the length of the written data in the read log, and writing the read data into a corresponding position of the memory space based on the offset-address-in-page of the written data in the read piece of index log.

2. The method of claim 1, wherein the second step of determining whether a remaining space of the data area of the physical page is sufficient comprises:
a step of computing a storing address of the data to be written based on a last piece of index log in the index area of the physical page;
a step of computing a result of the storing address of the data to be written plus a length of the data to be written, determining whether the result is bigger than a maximum offset address in the data area of the physical page, determining the remaining space of the physical page is not sufficient if the result is bigger than the maximum offset address in the data area of the physical page; otherwise, determining the remaining space of the data area of the physical page is sufficient;
wherein the searching for the physical page corresponding to the logical page number of the data to be read based on a corresponding relation between the logical page number and the physical page number comprises:
searching a mapping table of the logical page number and the physical page number, obtaining the physical page number corresponding to the logical page number of the data to be read, and searching for the physical page with the physical page number in the Flash.

3. The method of claim 1, wherein the step of determining whether the remaining space of the physical page is sufficient comprises:

a step of computing a remaining space of the index area of the physical page;

a step of determining whether the remaining space of the index area of the physical page is bigger than a length of a piece of index log, the remaining space of the index area of the physical page is sufficient if the remaining space of the index area of the physical page is bigger than the length of the piece of index log; otherwise, the remaining space of the index area of the physical page is not sufficient;

wherein the step of reading, in order, the piece of index log in the index area of the physical page, reading the corresponding data from the data area of the physical page based on the storing address of the written data and the length of the written data in the read log, and writing the read Flash data into a corresponding position of the memory space based on the offset-address-in-page of the written data in the read piece of index log comprises:

a step of reading, in order, a piece of index log in the index area of the physical page and taking the piece of the index log as a current piece of the index log;

a step of reading corresponding data from the data area of the physical page based on the storing address and the length of the written data in the current piece of index log, writing the read data in the corresponding position of the memory space based on the offset-address-in-page of the written data in the current piece of the index log;

a step of determining whether there is an unread piece of the index log in the index area of the physical page, executing a step of reading, in order, a piece of index log in the index area of the physical page and taking the piece of the index log as a current piece of the index log if there is an unread piece of index log in the index area of the physical page; otherwise, executing a step of reading the data to be read from the updated data based on the offset-address-in-page of the data to be read and a length of the data to be read, and ending the reading the data.

4. The method of claim 1, A method for writing and reading Flash data, wherein writing the Flash data comprises:
a first step of obtaining a logical page number of data to be written and an offset-address-in-page of the data to be written according to a writing address and searching for a physical page corresponding to the logical page number of the data to be written based on a corresponding relation between a logical page number and a physical page number;
a second step of determining whether a remaining space of the physical page is sufficient and, if so, completing writing data by writing a generated log in the remaining space, and ending the writing of the Flash data;
if the remaining space of the physical page is determined not to be sufficient, the writing comprises:
a third step of searching for a free page,
executing a fourth step of organizing page information of the physical page and information of the data to be written to obtain updated information and completing writing the Flash data in the free page based on the updated information; and
executing a fifth step of updating the corresponding relation between the logical page number and the physical page number;

wherein the reading the Flash data comprises:
a step of, when data in a physical page is required to be read, computing a logical page number of data to be read and an offset-address-in-page of the data to be read based on a reading address, and searching for a physical page corresponding to the logical page number of the data to be read based on the corresponding relation between the logical page number and the physical page number;
a step of reading a log in the physical page, reading corresponding data from the physical page based on a storing address of written data and a length of the written data in the read log, and updating corresponding data with the read data based on an offset-address-in-page of the written data in the read log; and
a step of reading the data to be read from the updated data based on the offset-address-in-page of the data to be read and a length of the data to be read, and ending the reading the Flash data; and wherein determining whether the remaining space of the physical page is sufficient, completing witting data by writing the generated log in the remaining space if the remaining space of the physical page is sufficient comprises:
determining whether the remaining spaces of both the data area and the index area of the physical page are sufficient, storing the data to be written in the data area of the physical page orderly if both the remaining spaces of the data area and the index area are sufficient, generating a piece of index log based on the offset-address-in-page of the data to be written, the length of the data to be written and the storing address of the data to be written, writing the generated piece of index log to the index area of the physical page orderly;

wherein the page information of the physical page comprises the piece of index log in the index area of the physical page, the information of the data to be written comprises the data to be written;

wherein organizing page information of the physical page and information of the data to be written to obtain updated information, completing writing data in the free page based on the updated information comprises:
reading data stored in the data area of the physical page, organizing the read data based on the piece of index log in the index area of the physical page and the data to be written to obtain valid data in the data area of the physical page, orderly writing the valid data in a data area of the free page, generating a piece of index log based on the valid data and writing the generated piece of index log in an index area of the free page;

wherein when data in a physical page is required to be read, reading the log in the physical page, reading corresponding data from the physical page based on the storing address of written data and the length of the written data in the read log, updating corresponding data with the read data based on as the offset-address-in-page of the written data in the read log and reading the data to be read from the updated data based on the offset-address-in-page of the data to be read and a length of the data to be read comprises:
a step of setting and resetting a read flag corresponding to the data to be read based on the length of the data to be read;
a step of searching for and reading a last piece of index log in the index area of the physical page and taking the last piece of index log as a current piece of index log;

a step of determining whether the current piece of index log relates to the data, of which the read flag is not set, in the data to be read based on the offset-address-in-page of the written data and the length of the written data in the current index flag, and executing a step of reading the related data from the physical page based on the storing address of the written data in the current piece of index log and setting a read flag corresponding to the read data if the current piece of index log relates to the data, of which the read flag is not set, in the data to be read;

if the current piece of index log does not relate to the data, of which the read flag is not set, in the data to be read, executing a step of reading a previous piece of index log of the current piece of index log and taking the previous piece of index log as a current piece of index log, and executing the step of determining whether the current piece of index log relates to the data, of which the read flag is not set, in the data to be read based on the offset-address-in-page of the written data and the length of the written data in the current index flag and executing the step of reading related data from the physical page based on the storing address of the written data in the current piece of index log and setting the read flag corresponding to the read data;

a step of checking the read flag corresponding to the data to be read, determining whether all of the data to be read is read, ending the reading the Flash data if all of the data to be read is read; otherwise, executing the step of reading a previous piece of index log of the current piece of index log and taking the previous piece of index log as a current piece of index log.

5. The method of claim 4, wherein determining whether the remaining space of the physical page is sufficient comprises:

a step of computing the remaining space of the index area of the physical page;

a step of determining whether the remaining space of the index area of the physical page is bigger than a length of a piece of index log, the remaining space of the index area of the physical page is sufficient if the remaining space of the index area of the physical page is bigger than the length of the piece of index log; otherwise, the remaining space of the index area of the physical page is not sufficient;

wherein searching for the last piece of index log in the index area of the physical page comprises:

traversing the index area of the physical page, when no less than a preset number of consecutive bytes of data, a value of which is a preset value, is found, an piece of index log before the no less than a preset number of consecutive bytes of data is the last piece of index log in the index area of the physical page;

or wherein searching for the last piece of index log in the index area of the physical page comprises:

a step of locating a first byte and a last byte in a valid memory space in the index area of the physical page, taking the first byte as a current start byte and taking the last byte as a current end byte, executing a step of locating a middle byte between the current start byte and the current end byte and taking the middle byte as a current middle byte, and executing a step of from a byte after the current middle byte, reading data of which a length equals a length of the a piece of index log, determining whether the read data is a piece of index log, taking the current middle byte as the current start byte if the read data is a piece of index log, executing the step of locating a middle byte between the current start byte and the current end byte and taking the middle byte as a current middle byte; otherwise, executing a step of from the current middle byte, forward reading data of which a length equals a length of a piece of index log, determining whether the read data is a piece of index log, the read data is the last piece of index log in the index area of the physical page if the read data is a piece of index log; otherwise, taking the current middle byte as a current end byte, executing the step of locating a middle byte between the current start byte and the current end byte and taking the middle byte as a current middle byte;

or wherein searching for the last piece of index log in the index area of the physical page comprises:

a step of locating a last byte of the valid memory space in the index area of the physical page, taking the last byte as a current byte, executing a step of from the current byte, forward reading data of which a length equals a length of a piece of index log, determining whether the read data is a piece of index log, the read data is the last piece of index log in the index area of the physical page if the read data is a piece of index log; otherwise, executing a step of taking a byte before the read data as the current byte, and executing the step of, from the current byte, the forward reading data of which a length equals a length of a piece of index log, determining whether the read data is a piece of index log, the read data is the last piece of index log in the index area of the physical page if the read data is a piece of index log.

6. The method of claim 5, wherein the step of computing the remaining space of the index area of the physical page comprises: searching for the last piece of index log in the index area of the physical page, obtaining number of used bytes in the index area of the physical page based on an offset address of an end of the last piece of index log in the physical page, computing a result of a size of the index area of the physical page minus the number of the used bytes in the index area of the physical page, obtaining the remaining space of the index area of the physical page.

7. The method of claim 6, wherein searching for the last piece of index log in the index area of the physical page comprises: traversing the index area of the physical page, when no less than a preset number of consecutive bytes data, a value of which is a preset value, are found, the piece of index log before the no less than a preset number of consecutive bytes data is the last piece of index log in the index area of the physical page.

8. The method of claim 6, wherein searching for the last piece of index log in the index area of the physical page comprises:

a step of locating the first byte and the last byte of the valid memory space in the index area of the physical page, taking the first byte as a current start byte and taking the last byte as a current end byte, executing a step of locating a middle byte between the current start byte and the current end byte, taking the middle byte as a current middle byte, executing a step of, from a byte after the current middle byte, backward reading data of which a length equals a length of a piece of index log, determining whether the read data is a piece of index log, taking the current middle byte as a current start byte;

executing the step of locating a middle byte between the current start byte and the current end byte, taking the middle byte as a current middle byte if the read data is the piece of index log;

if the read data is not the piece of the index log, executing a step of from the current middle byte, forward reading data of which a length equals a length of the piece of index log, determining whether the read data is a piece of index log, the read data is the last piece of index log in the index area of the physical page if the read data is a piece of index log; otherwise, taking the current middle byte as a current end byte, executing the step of locating a middle byte between the current start byte and the current end byte, taking the middle byte as a current middle byte;

or wherein searching for the last piece of index log in the index area of the physical page comprises:

a step of locating the last byte of the valid memory space in the index area of the physical page, taking the last byte as a current byte;

executing a step of, from the current byte, forward reading data of which a length equals a length of an piece of index log, determining whether the read data is a piece of index log, the read data is the last piece of index log in the index area of the physical page if the read data is a piece of index log;

if the read data is not a piece of the index log, executing a step of taking a byte before the read data as a current byte and executing step the step of, from the current byte, forward reading data of which a length equals a length of an piece of index log, determining whether the read data is a piece of index log, the read data is the last piece of index log in the index area of the physical page if the read data is a piece of index log.

9. The method of claim 8, wherein determining whether the read data is a piece of index log comprises: determining whether a value of the read data at each byte is a preset value, the read data is not a piece of index log if the value of the read data at each byte is a preset value; otherwise, the read data is a piece of index log.

10. The method of claim 1, wherein reading data stored in the data area of the physical page, organizing the read data based on the piece of index log in the index area of the physical page and the data to be written to obtain valid data in the data area of the physical page, orderly writing the valid data in a data area of the free page, generating a piece of index log based on the valid data and writing the generated piece of index log in an index area of the free page comprises:

a step of initializing a memory space of which a size is the same as a size of data area of the physical page;

a step of orderly reading pieces of index logs in the index area of the physical page, reading corresponding data from the data area of the physical page based on storing address of the written data and length of the written data the pieces of index logs, writing the read data into a corresponding position of the memory based on offset-address-in-page of the written data in the pieces of index logs;

a step of writing the data to be written in corresponding position of the memory based on the offset-address-in-page of the data to be written;

a step of traversing the memory space, when a piece of non-free area in the memory space is found in the memory space, reading the data in the non-free area, writing the read data in a data area of the free page, generating a piece of index log based on the read data and writing the piece of index log in an index area of the free page.

11. A method for writing and reading Flash data, wherein writing the Flash data comprises:

a first step of obtaining a logical page number of data to be written and an offset-address-in-page of the data to be written according to a writing address and searching for a physical page corresponding to the logical page number of the data to be written based on a corresponding relation between a logical page number and a physical page number;

a second step of determining whether a remaining space of the physical page is sufficient and, if so, completing writing data by writing a generated log in the remaining space and ending the writing of the Flash data;

if the remaining space of the physical page is determined not to be sufficient, the writing comprises:

a third step of searching for a free page, executing a fourth step of organizing page information of the physical page and information of the data to be written to obtain updated information and completing writing the Flash data in the free page based on the updated information; and executing a fifth step of updating the corresponding relation between the logical page number and the physical page number;

wherein the reading the Flash data comprises:

a step of, when data in a physical page is required to be read, computing a logical page number of data to be read and an offset-address-in-page of the data to be read based on a reading address, and searching for a physical page corresponding to the logical page number of the data to be read based on the corresponding relation between the logical page number and the physical page number;

a step of reading a log in the physical page, reading corresponding data from the physical page based on a storing address of written data and a length of the written data in the read log, and updating corresponding data with the read data based on an offset-address-in-page of the written data in the read log; and a step of reading the data to be read from the updated data based on the offset-address-in-page of the data to be read and a length of the data to be read, and ending the reading the Flash data; and wherein determining whether the remaining space of the physical page is sufficient, completing writing data by writing the generated piece of index log in the remaining space if the remaining space of the physical page is sufficient comprises:

determining whether the remaining spaces of a data area and an index area both are sufficient, orderly storing the data to be written in the data area of the physical page if the remaining spaces of a data area and an index area both are sufficient, generating a piece of index log based on an offset-address-in-page of the data to be written, a length of the data to be written and a storing address of the data to be written, writing the generated piece of index log orderly in the index area of the physical page;

wherein the page information of the physical page comprises the piece of index log in the index area of the physical page, the data information to be written comprises the data to be written, wherein organizing page information of the physical page and information of the data to be written to obtain updated information, completing writing data in the free page based on the updated information comprises:

reading data stored in the data area of the physical page, organizing the read data based on a piece of index log in the index area of the physical page and the data to be written to obtain valid data in the data area of the physical page, writing the valid data orderly in a data area of the free page, generating a piece of index log based on the valid data, writing the generated piece of index log orderly in an index area of the free page, updating the corresponding relation between the logical page number and the physical page number;

wherein when data in the physical page is required to be read, reading the log in the physical page, reading corresponding data from the physical page based on the storing address of written data and the length of the written data in the read log, updating corresponding data with the read data based on an offset-address-in-page of the written data in the read log and reading the data to be read from the updated data based on the offset-address-in-page of the data to be read this time and a length of the data to be read comprises:

a step of initializing a current offset-address-in-page based on the offset-address-in-page of the data to be read;

a step of searching for and reading a last piece of index log in the index area of the physical page, taking the last piece of index log in the index area as a current piece of index log;

executing a step of determining whether the current piece of index log relates to a current offset-address-in-page based on an offset-address-in-page of the written data and a length of the written data in the current piece of index log;

executing a step of reading data starting from the current offset-address-in-page of the data to be read which relates to the current piece of index log from the data area of the physical page based on a storing address of the written data in the current piece of index log, updating the current offset-address-in-page based on the read data if the current piece of index log relates to the current offset-address-in-page;

if the current piece of index log does not relate to the current offset-address-in-page, executing a step of reading a previous piece of index log of the current piece of index log and taking the previous piece of index log as a current piece of index log, and executing the step of determining whether the current piece of index log relates to the current offset-address-in-page based on the offset-address-in-page of the written data and the length of the written data in the current piece of index log;

a step of reading data starting from the current offset-address-in-page of the data to be read which relates to the current piece of index log from the data area of the physical page based on a storing address of the written data in the current piece of index log, updating the current offset-address-in-page based on the read data; and executing a step of determining whether all of the data to be read is read, and ending reading the Flash data if all of the data to be read is read; otherwise, executing the step of searching for and reading a last piece of index log in the index area of the physical page, and taking the last piece of index log in the index area as a current piece of index log.

12. The method of claim 11, wherein searching for a physical page corresponding to the logical page number of the data to be written based on a corresponding relation between a logical page number and a physical page number comprises: searching a mapping table of the logical page number and the physical page number, obtaining the physical page number corresponding to the logical page number of the data to be written, searching for the physical page with the physical page number;

wherein searching for a physical page corresponding to the logical page number of the data to be read based on the corresponding relation between the logical page number and the physical page number comprises: searching a mapping table of the logical page number and the physical page number, obtaining a physical page number corresponding to the logical page number of the data to be read, searching for the physical page with the physical page number in the Flash.

13. The method of claim 12, wherein updating the corresponding relation between the logical page number and the physical page number comprises: updating the physical page number corresponding to the logical page number of the data to be written in the mapping table of the logical page number and the physical page number to the physical page number of the free page;

wherein initializing a current offset-address-in-page based on the offset-address-in-page of the data to be read comprises initializing the current offset-address-in-page to be the offset-address-in-page of the data to be read;

wherein updating the current offset-address-in-page based on the read data comprises: updating the current offset-address-in-page to be a next offset-address-in-page of an offset-address-in-page corresponding to the last byte of the read data;

wherein determining whether all of the data to be is read comprises: computing a result of the offset-address-in-page of the data to be read plus a length of the data to be read, determining whether the result is smaller than the current offset-address-in-page, all of the data to be read is read if the result is smaller than the current offset-address-in-page; otherwise, not all of the data to be read is read.

14. The method of claim 11, wherein the step of initializing the current offset-address-in-page based on the offset-address-in-page of the data to be read further comprises: initializing a current count;

wherein in the method further comprises, after data starting from the current offset-address-in-page of the data to be read which relates to the current piece of index log is read from the data area of the physical page based on a storing address of the written data in the current piece of index log: updating the current count based on the read data;

wherein the step of determining whether all of the data to be read is read comprises: determining whether the current count equals a preset value, all of the data to be read is read if the current count equals the preset value; otherwise, not all of the data to be read is read.

15. A method for writing and reading Flash data, wherein writing the Flash data comprises:

a first step of obtaining a logical page number of data to be written and an offset-address-in-page of the data to be written according to a writing address and searching for a physical page corresponding to the logical page number of the data to be written based on a corresponding relation between a logical page number and a physical page number;

a second step of determining whether a remaining space of the physical page is sufficient and, if so, completing writing data by writing a generated log in the remaining space, and ending the writing of the Flash data;

if the remaining space of the physical page is determined not to be sufficient, the writing comprises:

a third step of searching for a free page, executing a fourth step of organizing page information of the physical page and information of the data to be written to obtain updated information and completing writing the Flash data in the free page based on the updated information; and executing a fifth step of updating the corresponding relation between the logical page number and the physical page number;

wherein the reading the Flash data comprises:

a step of, when data in a physical page is required to be read, computing a logical page number of data to be read and an offset-address-in-page of the data to be read based on a reading address, and searching for a physical page corresponding to the logical page number of the data to be read based on the corresponding relation between the logical page number and the physical page number;

a step of reading a log in the physical page, reading corresponding data from the physical page based on a storing address of written data and a length of the written data in the read log, and updating corresponding data with the read data based on an offset-address-in-page of the written data in the read log; and a step of reading the data to be read from the updated data based on the offset-address-in-page of the data to be read and a length of the data to be read, and ending the reading the Flash data; and wherein each physical page is divided into a valid data area and a log area, wherein determining whether the remaining space of the physical page is sufficient, completing writing data by writing a generated log in the remaining space if the remaining space of the physical page is sufficient comprises:

in a case that the physical page is not free, generating a log record according to a preset format based on the data to be written, a length of the data to be written and an offset-address-in-page of the data to be written, computing a size of a remaining space of the log area of the physical page, writing the generated log record in the log area of the physical page if the remaining space of the log area of the physical page is determined bigger than a length of the log record;

the page information of the physical page comprises the log record in the log area and valid data in valid data area of the physical page, the information of the data to be written comprises the generated log record, completing writing data in the free page based on the updated information if the remaining space of the log area of the physical page is not bigger than the length of the log record, wherein organizing page information of the physical page and information of the data to be written to obtain updated information comprises:

searching for a new free page, organizing data based on the log record in the log area, the generated log record and the valid data in the valid data area of the physical page, writing the organized data in a valid data area of the free page;

wherein computing the logical page number of the data to be read and an offset-address-in-page of the data to be read based on the reading address, searching for the physical page corresponding to the logical page number of the data to be read based on the corresponding relation between the logical page number and the physical page number and reading the data to be read based on the offset-address-in-page of the data to be read and the length of the data to be read comprises:

a step of reading the valid data in the valid data area of the physical page corresponding to the physical page number;

a step of reading the log records in the log area of the physical page piece by piece, updating corresponding data in the valid data with the data to be written in the log record based on a first offset-address-in-page in the log record;

a step of returning data in the updated data, wherein the returned date corresponds to the offset-address-in-page and a reading length of the data to be read.

16. The method of claim 15, wherein determining whether the physical page corresponding to the physical page number is a free page comprises: searching the log area of the physical page, determining whether a non-free flag in the log area of the physical page is set, the physical page is not free page if the non-free flag in the log area of the physical page is set; otherwise, the physical page is a free page;

wherein after the data obtained by organizing is written in the valid data area of the new free page, the method further comprises setting the non-free flag in the log area of the new free page;

wherein the step of reading the log records in the log area of the physical page piece by piece, updating corresponding data in the valid data with the data to be written in the log record based on a first offset-address-in-page in the log record comprises;

a step of reading, in order, a piece of log record in the log area of the Flash page;

a step of based on the first offset-address-in-page from the read log record, updating corresponding data in the valid data with the data to be written in the read log record;

a step of determining whether there is an unread log record in the log area of the Flash page, executing the step of reading, in order, a piece of log record in the log area of the Flash page if there is an unread log record in the log area of the Flash page; otherwise, executing the step of returning data in the updated data, wherein the returned data corresponds to the offset-address-in-page and a reading length of the data to be read.

17. The method of claim 16, wherein before whether the physical page corresponding to the physical page number is a free page is determined, the method further comprises: setting a first two bytes of log area of each physical page as a non-free flag, when data of the first two bytes of each physical page is preset data, setting the non-free flag; otherwise, resetting the non-free flag;

wherein setting the non-free flag in log area of the new free page comprises: modifying data of the first two bytes of the log area of the new free page to be the preset data;

wherein determining whether there is an unread log record in the log area of the physical page comprises: determining whether there are at least two bytes of 0xFF after the read log record, there is not an unread log record in the log area of the physical page if there are at least two bytes of 0xFF after the read log record; otherwise, there is an unread log record in the log area of the physical page exists.

18. The method of claim 15, wherein determining whether the physical page corresponding to the physical page number is a free page comprises:
reading a preset number of bytes of data from a start address of the physical page, determining whether a value of the read date at each byte is 0xFF, the physical page is a free page if the value of the read date at each byte is 0xFF; otherwise, the physical page is not free page;
or
reading a preset number of bytes of data starting from the first offset-address-in-page of the physical page, determining whether a value of read data at each byte is 0xFF, the physical page is a free page if the value of the read data at each byte is 0xFF; otherwise, the physical page is not a free page.

19. The method of claim 15, wherein when the physical page is not free, before a log record is generated according to a preset format based on the data to be written, the length of the data to be written and the offset-address-in-page of the data to be written, the method further comprises: determining whether the log area of the Flash page is fully written, searching for a new free page if the log area of the Flash page is fully written, reorganizing data based on the log record and the generated log record in the log area of the physical page and the valid data in the valid data area, writing data obtained by organizing in valid data area of the new free page; otherwise, generating the log record according to the preset format based on the data to be written, the length of the data to be written and the offset-address-in-page of the data to be written.

20. A method for writing and reading Flash data, wherein writing the Flash data comprises:
a first step of obtaining a logical page number of data to be written and an offset-address-in-page of the data to be written according to a writing address and searching for a physical page corresponding to the logical page number of the data to be written based on a corresponding relation between a logical page number and a physical page number;
a second step of determining whether a remaining space of the physical page is sufficient and, if so, completing writing data by writing a generated log in the remaining space, and ending the writing of the Flash data;
if the remaining space of the physical page is determined not to be sufficient, the writing comprises:
a third step of searching for a free page,
executing a fourth step of organizing page information of the physical page and information of the data to be written to obtain updated information and completing writing the Flash data in the free page based on the updated information; and
executing a fifth step of updating the corresponding relation between the logical page number and the physical page number;
wherein the reading the Flash data comprises:
a step of, when data in a physical page is required to be read, computing a logical page number of data to be read and an offset-address-in-page of the data to be read based on a reading address, and searching for a physical page corresponding to the logical page number of the data to be read based on the corresponding relation between the logical page number and the physical page number;
a step of reading a log in the physical page, reading corresponding data from the physical page based on a storing address of written data and a length of the written data in the read log, and updating corresponding data with the read data based on an offset-address-in-page of the written data in the read log; and
a step of reading the data to be read from the updated data based on the offset-address-in-page of the data to be read and a length of the data to be read, and ending the reading the Flash data; and
wherein the first step comprises computing the logical page number and the offset-address-in-page of the data to be written based on an update address, generating an updating log based on update data, a length of the update data and the offset-address-in-page of the data to be written, searching for a Flash page corresponding to the logical page number in the Flash based on the corresponding relation between the logic number and the physical page number;
wherein determining whether the remaining space of the physical page is sufficient, completing writing data by writing the generated log in the remaining space if the remaining space of the physical page is sufficient comprises:
a step of determining whether the physical page is a free page, writing the generated update log in the physical page and ending writing the Flash data if the physical page is a free page; or
a step of computing a size of a free area of the physical page, determining whether the size of the free area of the physical page is bigger than a length of the generated update log, writing the generated update log in the free area of the physical page if the size of the free area of the physical page is bigger than the length of the generated update log, ending writing the Flash data;
wherein the page information of the physical page comprises: the update log in the physical page, the data to be written comprises the generated update log,
if the size of the free area of the physical page is not bigger than the length of the generated update log, organizing page information of the physical page and information of data to be written to obtain updated information, completing writing data in the free page found based on the updated information comprises:
a step of searching for a new free page in Flash, organizing the update log in the physical page and the generated update log to obtaining true data in the physical page, obtaining a piece of update log based on the true data and writing the piece of update log in the new free page and ending writing the Flash data;
when data in the physical page is required to be read, the method further comprises:
a step of initializing a memory space of which a size is the same as the size of the Flash page;
wherein reading a log in the physical page, reading corresponding data from the physical page based on the storing address of written data and the length of the written data in the read log, updating corresponding data with the read data based on an offset-address-in-page of the written data in the read log comprises:
reading update logs in the physical page piece by piece, replacing corresponding data in the memory space with updated data in the read update log based on the offset-address-in-page of the data to be written this time in the read update log, obtaining true data of the Flash page;
wherein reading the data to be read this time from the updated data based on the offset-address-in-page of the data to be read this time and the length of the data to be read this time comprises:
a step of returning data corresponding to the offset-address-in-page and a read length of the data to be read this time in the true data of the Flash page.

21. The method of claim 20, wherein determining whether the physical page is a free page comprises:
reading a first preset number of bytes of data starting from a start address of the physical page, determining whether a value of read date at each byte is a preset value, the physical page is a free page if the value of the read date at each byte is the preset value; otherwise, the physical page is not a free page;
determining whether there is an unread update log in the physical page comprises: determining whether there are no less than a second preset number of bytes with a preset value after the current update log, there is not an unread update log in the Flash page if there are no less than a second preset number of bytes with the preset value after the current update log; otherwise, there is an unread update log is in the Flash page.

22. The method of claim 20, wherein before computing the size of the free area of the physical page, the method further comprises: determining whether the physical page is fully written, executing the step of searching for a new free page in Flash, organizing the update log in the physical page and the generated update log to obtain true data in the physical page, obtaining a piece of update log based on the true data and writing the piece of update log in the new free page and ending writing the Flash data if the physical page is fully written; otherwise, executing the step of computing a size of a free area of the physical page, determining whether the size of the free area of the physical page is bigger than a length of the generated update log, writing the generated update log in the free area of the physical page if the size of the free area of the physical page is bigger than the length of the generated update log, ending writing the Flash data;
wherein searching for the physical page corresponding to the logical page number of the data to be read based on the corresponding relation between the logical page number and the physical page number comprises: searching a mapping table of the logical page number and the physical page number, obtaining a physical page number corresponding to the logical page number, searching for the physical page corresponding to the physical page number in Flash, obtaining the physical page corresponding to the logical page.

23. The method of claim 22, wherein determining whether the physical page is fully written comprises: computing a number of used bytes of the physical page, determining whether the number of the used bytes of the physical page reaches a size of the physical page, the physical page is fully written if the number of the used bytes of the physical page reaches a size of the physical page; otherwise, the physical page is not fully written.

24. The method of claim 23, wherein computing a number of used bytes of the physical page comprises: traversing the physical page, recording a length of each update log of the physical page, when no less than a second preset number of consecutive bytes with a preset value are found, computing a sum of lengths of update logs and obtain the number of the used bytes of the physical page.

25. The method of claim 20, wherein computing a size of the free area of the physical page comprises: traversing the physical page, recording a length of each update log of the physical page, when no less than a second preset number of consecutive bytes of data with a preset value is found, computing a sum of lengths update logs, obtaining the number of used bytes of the physical page, obtaining the size of the free area of the physical page by computing a result of the size of the physical page minus the number of the used bytes of the physical page.

26. The method of claim 20, wherein organizing based on the update log in the physical page and the generated update log to obtain true data in the physical page comprises:
a step of initializing a memory space of which a size equals a size of the physical page;
a step of reading update logs in the physical page piece by piece, replacing corresponding data in the memory space with the updated data in the read update log based on a first offset-address-in-page in the read update log;
a step of reading the generated update log, based on a first offset-address-in-page in the update log, replacing data corresponding to the memory space with the generated update log, obtaining the true data of the physical page.

27. The method of claim 26, wherein the step of reading update logs in the physical page piece by piece, replacing corresponding data in the memory space with the updated data in the read update log based on a first offset-address-in-page in the read update log comprises:
a step of reading an update log in the physical page orderly and taking the update log as a current update log;
a step of based on a first offset-address-in-page in the current update log, replacing corresponding data in the memory space with updated data in the current update log;
a step of determining whether there is an unread update log in the physical page and if so, executing the step of reading an update log in the physical page orderly and taking the update log as a current update log;
if there is not an unread update log in the physical page, executing the step of reading the generated update log, based on a first offset-address-in-page in the update log, replacing data corresponding to the memory space with the generated update log, and obtaining the true data of the physical page.

28. The method of claim 27, wherein determining whether there is an unread update log in the physical page comprises: determining whether there are no less than a second preset number of bytes with a preset value after the current update log, there is not an unread update log in the physical page if there are no less than the second preset number of bytes with the preset value after the current update log; otherwise, there is an unread update log in the physical page.

29. The method of claim 20, wherein obtaining a piece of update log based on the true data comprises: obtaining the piece of update log based on a length of the true data, the true data and a start address of the data of the new free page.

* * * * *